(12) United States Patent
Al-Ghouleh

(10) Patent No.: US 11,939,274 B2
(45) Date of Patent: Mar. 26, 2024

(54) CARBONATION-ACTIVATED CLINKER BINDER FROM INCINERATION RESIDUES

(71) Applicant: Zaid Al-Ghouleh, Montreal (CA)

(72) Inventor: Zaid Al-Ghouleh, Montreal (CA)

(73) Assignee: REVERSEEFFECT TECHNOLOGIES INC., Ontario (CA)

( * ) Notice: Subject to any disclaimer, the term of this patent is extended or adjusted under 35 U.S.C. 154(b) by 868 days.

(21) Appl. No.: 16/485,683

(22) PCT Filed: Mar. 23, 2018

(86) PCT No.: PCT/CA2018/050355
§ 371 (c)(1),
(2) Date: Aug. 13, 2019

(87) PCT Pub. No.: WO2018/170605
PCT Pub. Date: Sep. 27, 2018

(65) Prior Publication Data
US 2020/0055774 A1  Feb. 20, 2020

Related U.S. Application Data

(60) Provisional application No. 62/475,587, filed on Mar. 23, 2017.

(51) Int. Cl.
*C04B 2/10* (2006.01)
*C04B 7/02* (2006.01)
(Continued)

(52) U.S. Cl.
CPC .............. *C04B 7/48* (2013.01); *C04B 7/02* (2013.01); *C04B 2235/3208* (2013.01);
(Continued)

(58) Field of Classification Search
USPC ........ 106/638, 697, 700, 705, 709, 713, 739
See application file for complete search history.

(56) References Cited

U.S. PATENT DOCUMENTS 5,196,620 A * 3/1993 Gustin .................. C04B 18/021
428/404
7,247,601 B1 * 7/2007 Hills ..................... C02F 1/5245
502/407

(Continued)

FOREIGN PATENT DOCUMENTS

JP        2016169262 A    9/2016

*Primary Examiner* — James E McDonough
(74) *Attorney, Agent, or Firm* — Benoit & Côté Inc.

(57) ABSTRACT

A process for synthesis of a waste-derived $CO_2$-activated clinker, which comprises firing nodules at temperatures between 1000-1100° C. for a time sufficient to obtain $CO_2$-reactive clinker phases within the nodules, cooling the clinker nodules, and reducing to powder to obtain a clinker powder; wherein the nodules are agglomerates of a stoichiometric mix of uniformly-sized powders of municipal solid waste (MSW) incineration residues; wherein the stoichiometric mix respects the primary compositional requisite of containing Ca, Al, and Si in their oxide forms within the ranges of 35-45 wt. % CaO, 2-8 wt. % $Al_2O_3$, and 12-20 wt. % $SiO_2$; wherein the final stoichiometric mix has a total-sulfur content of 1 to 10 wt. %, total-carbon content of 2 to 20 wt. %, and a total-chlorine content of 2 to 15 wt. %.

11 Claims, 14 Drawing Sheets

| Blend | CaO | Al₂O₃ | SiO₂ |
|---|---|---|---|
| A | 65.19 | 10.64 | 24.16 |
| B | 65.51 | 8.84 | 25.65 |
| C | 65.51 | 8.84 | 25.65 |
| D | 66.88 | 8.47 | 24.65 |
| E | 69.80 | 7.72 | 22.47 |
| F | 68.87 | 8.73 | 22.39 |
| G | 68.75 | 8.66 | 22.58 |
| H | 59.78 | 11.34 | 28.88 |
| I | 66.75 | 9.27 | 23.98 |
| J | 70.48 | 8.15 | 21.37 |
| K | 70.25 | 8.24 | 21.51 |
| L | 68.47 | 8.77 | 22.77 |
| M | 69.79 | 8.43 | 21.78 |
| N | 71.40 | 7.95 | 20.65 |
| O | 56.81 | 12.21 | 30.99 |
| P | 69.44 | 8.57 | 22.00 |

(51) Int. Cl.
*C04B 7/48* (2006.01)
*C04B 7/00* (2006.01)
*C04B 7/34* (2006.01)
*C04B 9/12* (2006.01)
*C04B 14/40* (2006.01)
*C04B 18/06* (2006.01)
*C04B 18/18* (2006.01)
*C04B 28/00* (2006.01)
*C04B 28/04* (2006.01)
*C04B 32/00* (2006.01)

(52) U.S. Cl.
CPC ............... *C04B 2235/3217* (2013.01); *C04B 2235/3427* (2013.01); *C04B 2235/5224* (2013.01)

(56) References Cited

U.S. PATENT DOCUMENTS

| | | |
|---|---|---|
| 2003/0010257 A1 | 1/2003 | Kabata et al. |
| 2008/0026158 A1* | 1/2008 | Hansen ............... C09D 1/08 427/421.1 |

* cited by examiner

CARBONATION-ACTIVATED CLINKER BINDER FROM INCINERATION RESIDUES

CROSS-REFERENCE TO RELATED APPLICATION

This application claims priority from U.S. patent provisional application 62/475,587 filed Mar. 23, 2017, the specification of which is hereby incorporated herein by reference in its entirety.

BACKGROUND

(a) Field

The subject matter disclosed generally relates to a raw clinker composition from municipal solid waste (MSW) incinerator residues activated by carbonation, new building products and processes of preparation thereof.

(b) Related Prior Art

Landfilling remains the most popular disposal practice for municipal solid wastes (MSW). In addition to occupying vast amounts of land, conventional landfilling associates long-term problems such as GHG (Green House Gas) emissions, odor, and soil and groundwater contamination due to leachate seepage. Landfill leachate contains substantial amounts of toxic organics and heavy metals. Incineration presents a less intrusive alternative in that it reduces the volume of MSW by 90%, eliminates organic contaminants, and takes advantage of the calorific value of MSW to produce energy. Incinerators are also known as Waste-to-Energy (WTE) facilities. Nonetheless, incineration generates carbon emissions and ash by-products that mostly amass in landfills.

In light of the steady global drive towards environmental sustainability, emerging initiatives seek to implement more comprehensive measures towards the need to recycle industrial wastes, mitigate anthropogenic emissions, and reduce energy consumption. Concrete is the world's most used construction material, with global estimates of 3.8 billion m$^3$ per year 9 billion tons). It is essentially comprised of aggregates (natural stone), cement binder, and water, in order of descending weight-percent content. Its production is one of the most ecologically-taxing industrial practices, facing increased restrictions and harsher growing regulatory codes. In addition to being energy and emission intensive, the acquisition of concrete's major components (cement and aggregate) contributes to the heavy depletion of natural resources. The carbon emissions from cement manufacturing accounts for 5% of the total global anthropogenic carbon dioxide, mainly attributable to cement's high-temperature clinkering step (~1500° C.) and accompanied calcination of limestone. It is estimated that producing a ton of cement clinker consumes 850,000 kcal of energy, requires 1.7 tons of natural raw materials, and generates approximately 0.85 tons of $CO_2$. On the other hand, the extraction of natural aggregates (the major constituent of concrete) associates heavy excavation undertakings and continues to stir up environmental concerns related to erosion. Current consumption rates can limit the presence of accessible resources in the future. Therefore, replacing natural raw concrete components with suitable waste alternatives—that meet the criteria of less emissions and/or energy consumption—presents proactive efforts towards sustainable construction best-practices.

From another end, the mitigation of carbon-dioxide has become a collective global challenge, with legislative efforts in many countries mandating harsher emission limits, and seeking carbon diversion from the atmosphere by implementing technologies that capture $CO_2$ from flue-gases for subsequent utilization and/or storage. The Cap and Trade system (Ontario, Quebec, British Columbia, and Manitoba), under the framework of the Western Climate Initiative, and Alberta's Emissions Reduction Alberta (formerly CCEMC) fund are examples of such domestic initiatives. These programs enforce an allowable quota for GHG emitters, where deviations are to be offset by levies and/or traded via carbon credits on a per tonnage basis. Such monetizing of CO, had proven effective in reducing emissions, further incentivizing carbon capture and utilization/storage. The concept of Carbon Capture and Storage (CCS) presents valid means for the effective containment and long-term fixation of $CO_2$. In 2005, the IPCC (Intergovernmental Panel on Climate Control) launched a global forum for discussing CCS at the policymaking level.

It would be highly desirable to obtain a clinker product made primarily from municipal solid waste (MSW) incinerator residues, whose binding strength is activated by carbonation, as the sustainability benefits would be numerous and address themes related to: hazardous waste containment and recycling; landfill-diversion; resource-conservation; and carbon emission mitigation.

SUMMARY

In accordance with the present invention there is provided, a raw clinker composition from municipal solid waste (MSW) incinerator residues activated by carbonation, new building products and processes of preparation thereof.

In accordance with the present invention there is provided, a process for the in situ synthesis of a waste-derived, $CO_2$-activated clinker binder from carefully prepared stoichiometric mixes of municipal solid waste (MSW) incineration by-products, where processing is achieved by an embedded or stand-alone tubular kiln-like device operating between 1000-1100° C. and powered by locally-sourced energy recovered from generated heat and/or electricity within an incinerator facility.

In accordance with the present invention there is provided, a clinker binder material produced according to the process of the present invention with a unique mineralogy and ability to achieve rapid binding strength from carbonation, as well as additional latent strength from subsequent hydraulic reactivity.

In accordance with the present invention there is provided, a process for the priming of incinerator bottom ash residues into a stable and suitably graded material for use as a lightweight aggregate.

In accordance with the present invention there is provided, a process for the production of building units, which comprise combining the clinker of the present invention as the binder and the primed bottom ash of the present invention as the aggregates component, with carbon dioxide as the primary strength activator.

In accordance with the present invention there is provided, a building product produced by the process of the present invention suited for non-reinforced low-loadbearing/non-loadbearing concrete precast applications

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
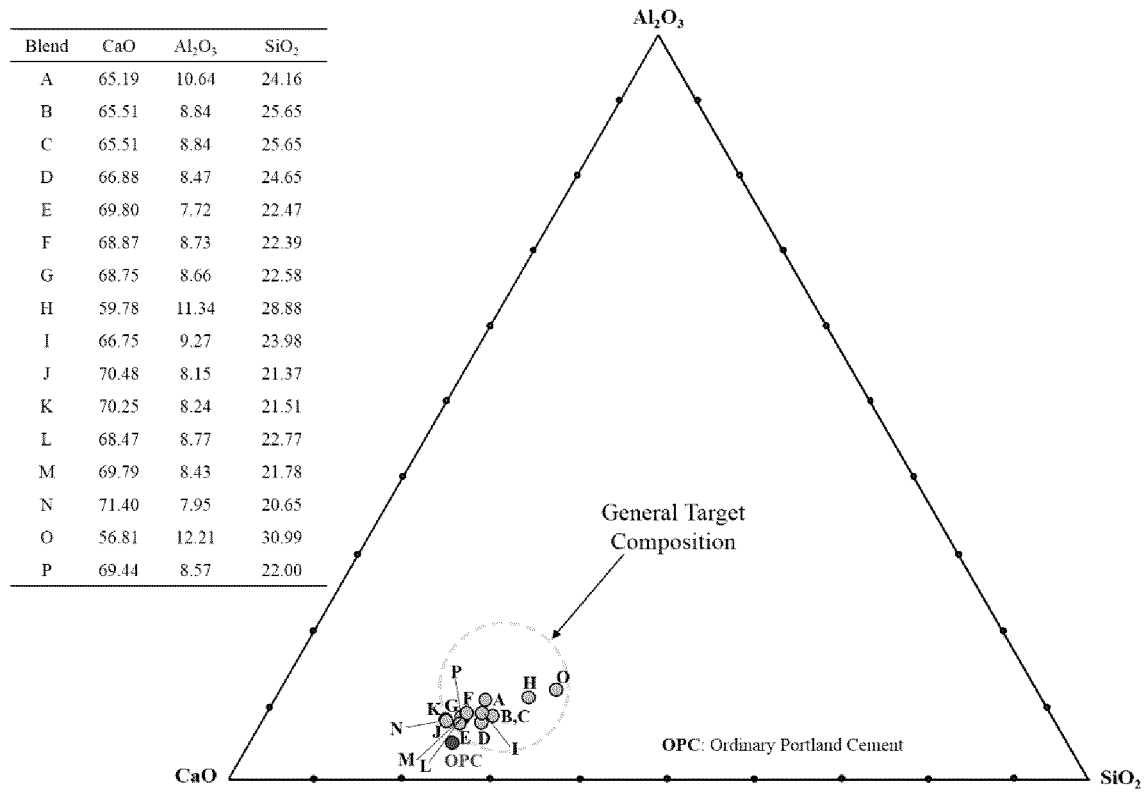
FIG. 1 CAS (CaO—Al$_2$O$_3$—SiO$_2$) ternary phase diagram with point locations for the normalized raw clinker blends in Table 2.

This invention describes a process that converts incinerator ash residues into value-added building products. It is comprised of two major steps: 1. Clinker firing; and, 2. Building-units production.

Step 1—Clinker firing: entails the synthesis of a cement-like clinker binder from carefully proportioned stoichiometric mixes of ash residues, with minimal to no use of virgin raw materials. Prior, the ashes are suitably primed to uniform powder size and thoroughly mixed to ensure homogeneity (pulverizing and mixing can be completed separately or combined into a single step). Nodules are then made out of the powder mixture through the use of a nodulizer machine, where slight additions of water aid in agglomeration. The nodules are then fired at temperatures between 1000-1100° C. for durations that can range from 30 to 60 minutes. Since incinerators normally operate at that temperature range, energy is of abundance within these facilities. Therefore, heat required for clinkering can be locally-sourced. It can be recovered via convective/radiative heat transfer through carrying out thermal processing in a tubular kiln apparatus installed inside the combustion chamber of the incinerator and within the desired target heat-zone. Alternatively, a portion of the incinerator's self-generated electricity could also be allocated for the powering of an auxiliary clinkering furnace, where the target temperature is achieved through electrical resistance heating. After nodule firing is complete, the clinker is cooled to room temperature. The rate of cooling is a critical parameter and is conducted in a manner designed to avoid undesirable phase transformations that would alter the target mineralogy of the final clinker product. Once cooled, the clinker is reduced to a powder with a cement-like fineness to serve as the binder component of building products. The ash-derived clinker is special in that it is activated primarily by carbonation (i.e. reaction with CO$_2$) for consolidative strength-gain, but can also possess latent hydraulic behavior for further ultimate strength development. Since the clinker product is not meant to be a hydraulic binder, the most suited applications would be for making dry-cast/precast products (e.g. pavers, interlock, bricks, retaining walls, architectural/artificial stone, and masonry units), both load-bearing and non-load-bearing.

Step 2—Building-units production: entails combining the synthesized ash-derived clinker (Step 1) with suitably-primed bottom ash to obtain final building products. Bottom ash makes up 80-85 wt. % of the total ash by-product generated by an incinerator. In this invention, it is used as the aggregate component of the final building products, but is subject to preparatory processing prior. The as-collected bottom ash is first dried and then stabilized by volatilization, a process that involves the heating of hand-patted mounds of bottom ash at 200° C. The heat initiates an exothermic volatilization that burns off the ash's residual organic content. Volatilization is recommended for bottom ash residues that exhibit high organic contents. This step could be skipped for bottom ash residues that have been adequately volatized during incineration. The stabilized bottom ash is then sieve-graded to fit a particle size distribution criteria consistent with commercial fine lightweight aggregates. The bottom ash aggregates are then mixed with the synthesized clinker and water, casted, demolded, subject to controlled partial drying, and then cured by reacting with CO$_2$ in an air-tight enclosure capable of withstanding marginal negative (up to −3 psig) and positive pressures (up to 14 psig). The end-product is suited for applications that specify low-loadbearing/non-loadbearing precast and dry-cast non-reinforced concrete, such as pavers/interlocks for walkways, brick for building facades, and non-structural masonry blocks.

The invention's two-step process can be in situ, allowing an incinerator to consume its by-product streams at point source. Not only will this potentially demonstrate a near-zero-waste operation, it will also offset tipping fee costs associated with the traditional landfill disposal of waste ash residues. In fact, the production of usable building goods can generate a new revenue stream for the operator. Moreover, with the regulatory push towards the monetizing/taxing of carbon emissions, and tangible advancements in capturing technologies, it may become more feasible for carbon emitters to install $CO_2$ capturing systems in the near future. In such a scenario, an incinerator could additionally be able to source its own $CO_2$ for local use in the curing of the residue-derived building products.

The process is innovative in that: (i) a waste-ash-derived low-energy clinker material is synthesized at 1000-1100° C. to serve as a cement-like binder that is activated primarily by reacting with $CO_2$ gas; (ii) fully waste-derived building units are attained by casting and carbonating combinations of clinker and suitably primed bottom ash aggregates; (iii) an incinerator can potentially be turned into a closed-loop clean production operation, whereby almost all by-product streams (bottom ash, fly ash, waste-lime, and, in the future, $CO_2$) can be locally consumed at point source to produce building units.

In similar previous studies involving MSW-derived cement, residue-use was partial, clinkering temperatures ranged between 1350 and 1450° C., and the binder product was only hydraulic. Extensive energy is required to perform clinkering at such high temperatures. The technical challenge with lower clinkering temperatures is that not enough energy is supplied to form hydraulic phases, ones that harden when mixed with water. Cement produced at temperatures lower than 1300° C. mainly comprise low-energy calcium silicates ($CaSiO_3$, $Ca_2SiO_4$ or belite) of different polymorphs, and other general calcio-alumino-silicate/sulfate phases. Such cements are therefore presumed to be only latent hydraulic or even non-hydraulic. These phases can however be activated by carbonation.

Due to the very complex compositional nature of MSW incinerator residues, the mineralogy of the generated clinker is expected to be equally complex. Careful compositional considerations, along with thermochemical simulations and experimental trial & error, all helped in devising the processing methodology favoring the thermodynamic nucleation of target $CO_2$-reactive phases in the final clinker.

Target $CO_2$-reactive phases in the final ash-derived clinker may comprise one or a combination of the following minerals: ellestadite (chloro, fluor, or hydroxyl fixations), mono-calcium silicates (e.g. wollastonite), di-calcium-silicates (belite, sulfo-aluminate belite), and, less-commonly, tri-calcium-silicates (alite). These phases comprise 40-70% the weight of the final clinker product. The remaining portion of the clinker may comprise one or more of the following mineral phases: wadalite, mayenite, akermanite, gehlenite, bredigite, anhydrite, ronderfite, quartz, halite/sylvite, and an amorphous fraction with no detectable mineralogy. The latter group of phases does not necessarily contribute to binding and strength, but can lend a stabilizing effect by incorporating heavy metals and other unstable ions into their molecular structure (e.g. chlorine). The following are weight-percent ranges of mineral components making up typical mineralogical distributions of the final clinker product: 25-50% Chloro-ellestadite ($Ca_{10}(SiO_4)_3(SO_4)_3Cl_2$); 5-25% Di-calcium-silicates (α, β, and/or γ $Ca_2SiO_4$); 5-15% Wadalite/Mayenite ($Ca_6Al_5Si_2O_{16}Cl_3$/$Ca_{12}Al_{14}O_{33}$); 5-7.5% Ronderfite ($Ca_8Mg(SiO_4)_4Cl_2$); 2-6% Halite/Sylvite (NaCl/KCl); 5-15% Akermanite/Gehlenite ($Ca_2MgSi_2O_7$/$CaAl_2Si_2O_7$); 5-15% Bredigite (($Ca,Ba)Ca_{13}Mg_2(SiO_4)_8$); 1-7.5% Anhydrite ($CaSO_4$); 1-2% Quartz ($SiO_2$); and 10-30% amorphous undetectable content.

During the carbonation of the ash-derived clinker, the mineral combination of ellestadite/calcium-silicates engages in a reaction with $CO_2$ to yield a final hardened composite paste matrix comprised of C—S—H, $CaCO_3$, and gypsum. This composite matrix is what brings about the binding effect. C—S—H (calcium-silicate-hydrate) is commonly known to be a product of cement hydration, and found abundantly in cured concrete. It is mainly responsible for binding and strength development. Gypsum can also assist the binder's cohesion as it brings about a plaster-like hardening effect. The $CaCO_3$ crystals precipitate within the composite matrix, providing a sort of granular reinforcement, further densifying the matrix and promoting its resilience. Carbonation curing is optimally carried out under pressurized conditions (1 to 20 psig), using high purity $CO_2$, and for durations that range anywhere between 2 and 24 hours.

Generally, traditional cement-making is guided compositionally by the $CaO$—$Al_2O_3$—$SiO_2$ (CAS) ternary phase diagram, as these three oxide constituents make up the majority of the composition. Maintaining a specific compositional criteria is one of the crucial parameters needed to ensure consistent formation of desired mineral phases during clinkering. The same CAS ternary system is used for this invention's ash-derived clinker since $CaO$, $Al_2O_3$, and $SiO_2$ comprise 60-70% the weight of the raw clinker mix. If one was to normalize these components to 100%, raw clinker formulations should have a composition that falls within the following ranges: 56-72 wt. % $CaO$, 7-13 wt. % $Al_2O_3$, and 20-32 wt. % $SiO_2$.

The incineration of MSW generates three types of solid waste by-products, namely, bottom ash, fly ash, and waste-lime. Bottom ash is the charred residue collected from the bottom of the combustion chamber. Fly ash is entrained in the flue-gas stream and is usually collected further upstream from the heat recovery boiler and dust collectors (e.g. baghouses, ESP's). Waste-lime is lime expended after being used in the conditioning and treatment of the flue-gases by air pollution control (APC) devices. The composition of each ash material can be partially exploited such that a stoichiometric combination of two or three of the ashes can serve as a sufficient source of $CaO$, $Al_2O_3$, and $SiO_2$ for raw clinker mixtures. Nonetheless, the ashes also contain other oxides, as well as heavy metals, organic contaminants (dioxins, furans, VOC, PAH), and high levels of chlorine (especially fly ash and waste-lime). The presence of the other oxides may result in the forming of unintended mineral phases at the expense of desired ones during clinkering. While unavoidable, levels are to be preferably kept below certain influencing thresholds. This could be assisted by thermodynamic simulations. Nonetheless, the presence of certain oxides may be beneficial in lending a fluxing effect, to aid with firing efficiency, and also in lending a doping effect to help stabilize desired mineral species without allowing their regression or transformation into less desired phases. Waste-lime can serve as the primary source of $CaO$, but is also high in sulfur, carbon, and chlorine. Bottom ash is a source of $CaO$, $Al_2O_3$, and $SiO_2$, with a high content of $Fe_2O_3$ and carbon (in the form of organics, carbonates, and/or free-carbon). Fly ash is also a source of CaO, $Al_2O_3$, and $SiO_2$, but is also generally high in MgO, $Na_2O$, $K_2O$, sulfur, and chlorine.

For attaining ash-derived clinker with a consistent final mineralogy and binding performance, certain compositional criteria can be employed to guide the preparation of the raw mix. First, the triplet oxide components of CaO, $Al_2O_3$, and $SiO_2$ should make up between 56 and 70 wt. % of the total raw mix content. Different raw formulations could be prepared with varying contents. The following are target ranges for these three oxides when using MSW ash: 35-45 wt. % CaO, 2.0-7.5 wt. % $Al_2O_3$, and 12-20 wt. % $SiO_2$. Deficiencies in CaO and $SiO_2$ could be supplemented by partial additions of commercial lime (or hydrated lime) and fine silica sand, respectively. Moreover, compositional ratios like the Lime Saturation Factor (LSF), Alumina Ratio (AR), Silica Ratio (SR), Basicity Ratio (BR), Activity Index (AI), Hydraulic Modulus (HM), Alkalinity Modulus (Cm), Lime Ratio (LR), and Alumina-sulfur ratio (P), can serve as quality control parameters. The starting sulfur, carbon, and chlorine contents are also accounted for. Raw formulations disclosed in this invention nominally range between the following values: (LSF: 0.55-1.05), (SR: 1.65-2.00), (AR: 1.90-5.80), (BR: 1.80-3.50), (AI: 2.25-2.90), (HM: 1.10-1.90), (Cm: 0.75-1.50), (LR: 1.30-2.50) (P: 0.20-4.85), (total-sulfur: 1-10 wt. %), (total-carbon: 2.5-20 wt. %), and (Chlorine: 2.5-15 wt. %).

For Step 2 (building-units production), bottom ash stabilized by volatilization is sieve-graded to meet the aggregate-size criteria for the sought final building product application. Absorption of the aggregates is a crucial parameter for correcting mix water amounts during mixing and casting, and is measured according to ASTM C1761. For the example of paver block products, processed bottom ash was graded to the following criteria: 16.7%≥5 mm; 16.7%≥2.5 mm; 27.7%≥1.25 mm; 22.2%≥0.63 mm; and 16.7%≥0.315 mm. The mixing ratio was 1:0.35:2.65 (clinker:water:aggregates). After mixing and casting, the pavers were demolded and allowed to stand for partial drying in order to promote better $CO_2$ gas diffusion during the subsequent carbonation curing step. The semi-dried pavers were carbonated for 2 hours at a pressure of 20 psig. Preliminary trials yielded paver products with a compressive strength of 11.5±2.5 MPa, and a $CO_2$ uptake equivalent to 10-15% the initial clinker mass.

Novelty:

The presented closed-loop system offers the potential of turning incineration from a waste management option into a clean production. Almost all ashes can be consumed at point source to produce precast/dry-cast building units. Adoption of this closed-loop system by incinerator operators will associate considerable running cost savings due to the aversion of ash containment and associated tipping fees, in addition to generating a potential revenue stream from the sale of the building units. Additionally, carbon dioxide could be diverted from the atmosphere and sourced as the expediting curing agent for the solidification of the final building units. Such utilization is highly championed in emerging green low-carbon economies that endorse carbon taxing/trading initiatives.

The clinkering process utilizes heat and/or electricity locally recovered within the incinerator. The final $CO_2$-laden building products are fully waste-derived and have zero embodied carbon and energy footprints, since only recovered energy and minimal virgin resources are used in their fabrication.

Low-energy $CO_2$-activated clinker is generated within a 1000-1100° C. temperature range almost entirely from MSW incinerator residues, with minimal to no additions of virgin materials. Strength is primarily achieved by carbonation, but may also be further compounded by a latent hydraulic reaction. The high temperature clinkering destroys organic contaminants found in fly ash, while metal traces become stabilized through structural incorporation into clinker phases. Heavy metal leaching will be significantly reduced. The carbonation of the clinker lends further chemical stability as the precipitation of carbonates and the generation of the binding phases generate an intimately interlocked and densified structure, displaying better physical resilience and improved resistance to ingress and leaching.

The processing methodology prescribed is believed to contribute a dual stabilization mechanisms. The first relates to clinkering, which involves the thermal destruction of organic contaminants, and the structural incorporation of hazardous elemental components in the generated clinker phases. The second stabilizing mechanism arises from carbonation, where the monolith paste matrix generated as a result of the reaction induces an encapsulation effect. Moreover, the precipitation of carbonates lends a densification effect to the binder's microstructure, reducing porosity and permeability. This aids in the retention of leachable components.

Bottom ash is suitably treated and primed to serve as an aggregate material. The graded bottom ash aggregates are mixed with the ash-derived clinker to cast non-reinforced precast building products. Each unit will sequester an amount of $CO_2$ equivalent to 10-20% the weight of clinker in the initial mix.

This project is of practical importance and aimed at developing a more sustainable processing route that could potentially alter the conventional practice of incineration.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

The present invention relates to the innovative and sustainable use of incineration by-products, namely, ash residues (and possibly emission-recovered carbon dioxide once legislatively supported in the near future) to their best value-added potential for the development of ecological building products. First, a new cement-like clinker product is processed from fly ash, waste-lime, and bottom ash, with minimal to no use of additives, and at an incineration-equivalent temperature of 1000-1100° C. Second, the obtained clinker is combined with treated and graded bottom ash aggregates, and cast into building units that are consolidated via carbonation.

I. Ash-Derived Clinker Synthesis:

Municipal solid wastes processed by an incinerator are quite variable in composition and differ from region-to-region, day-to-day, and even batch-to-batch. As a result, a similar compositional variance is exhibited by the generated ash by-products. This poses a challenge in attaining consistent clinker end-products. To address this problem, a meticulous compositional criteria was devised to better guide the combination of ashes when preparing raw clinker powder mixes. Prior to mixing, the ash materials were liberated of impurities and undesired irregular components (steel scrap, paper, etc. . . . ), and then reduced to a fine powder (e.g. using a pulverizer or ball mill). The combination of two or three of the powdered ash residues (bottom ash, fly ash, waste-lime) were then thoroughly mixed to achieve homogenization and powder consistency. Table 1 identifies compositional ratios that helped guide the proportioning of ashes when preparing the raw clinker blends. The ranges reveal the limits within which clinker synthesis was possible. The 'optimal' values in the table are associated with clinker products that exhibited consistent features and performances.

values somewhat convey the window of flexibility in compositional variance. The blends were prepared by combining two or three ash residues. One important criteria that had to be ensured for all blends was having the CAS (CaO—$Al_2O_3$—$SiO_2$) components comprise 55-70 wt. % of these raw mixes. Individually, these oxides ranged between the following ranges: 35-45 wt. % CaO, 2-7.5 wt. % $Al_2O_3$, and 12-20 wt. % $SiO_2$. The elemental ranges for total-S, total-C, and Cl demonstrate more the tolerance of clinker synthesis to these components rather than a compositional requirement. Nonetheless, partial amounts of S and Cl are also

TABLE 1

Compositional criteria for ash mixing and raw clinker blend preparation.

| Parameter | Formula | Range | Optimal |
|---|---|---|---|
| Lime Saturation Factor (LSF) | $\dfrac{\% CaO}{[(2.8 \times \% SiO_2) + (1.2 \times \% Al_2O_3) + (0.65 \times \% Fe_2O_3)]}$ | 0.55-1.05 | 0.85 |
| Silica Ratio (SR) | $\dfrac{\% SiO}{(\% Al_2O_3) + (\% Fe_2O_3)}$ | 0.65-2.00 | 1.85 |
| Alumina Ratio (AR) | $\dfrac{\% Al_2O_3}{\% Fe_2O_3}$ | 1.90-5.82 | 2.30 |
| Basicity Ratio (BR) | $\dfrac{\% CaO}{\% SiO_2}$ | 1.80-3.50 | 2.85 |
| Activity Index (AI) | $\dfrac{\% SiO}{\% Al_2O_3}$ | 2.25-2.90 | 2.65 |
| Hydraulic Modulus (HM) | $\dfrac{[\% CaO - (0.7 \times \% SO_3)]}{[\% SiO_2 + \% Al_2O_3 + \% Fe_2O_3]}$ | 1.10-1.90 | 1.53 |
| Alkalinity Modulus (Cm) | $\dfrac{[\% CaO - (0.7 \times \% TiO_2)]}{(1.87 \times \% SiO_2) + 0.73(\% Al_2O_3 - 0.64 \times \% Fe_2O_3) + (1.4 \times \% Fe_2O_3)]}$ | 0.75-1.50 | 1.20 |
| Lime Ratio (LR) | $\dfrac{\% CaO}{(\% Al_2O_3 + \% SiO_2)}$ | 1.30-2.50 | 2.10 |
| Alumina-sulfur Ratio (P) | $\dfrac{\% Al_2O_3}{\% SO_3}$ | 0.20-4.85 | 0.65 |
| Total-Sulfur | — | 1-10 wt. % | |
| Total-Carbon | — | 2.5-20 wt. % | |
| Chlorine | — | 2.5-15 wt. % | |

LSF, AR, and SR are commonly used in the traditional making of ordinary Portland cement (OPC), which is known to fall within the following ranges for OPC: LSF=0.85-0.95, SR=1.9-3.2, and AR=1.7-2.5. Table 2 lists the unique compositional criteria of different raw clinker blends prepared as prescribed by the methodologies of this invention. These needed in the formation of desired phases in the final clinker. Moreover, the complex oxide constituents of the raw ashes could be lending a fluxing effect, to lower the melting point and enhance clinker burnability, and/or a doping effect, to fix desirable clinker phases and eliminate regression to non-reactive ones.

TABLE 2

Compositional ratios and weight percentages of raw clinker blends

| | Ratios | | | | | | | | | (%) | (%) | (%) | (%) | (%) | (%) |
|---|---|---|---|---|---|---|---|---|---|---|---|---|---|---|---|
| Blend | LSF | SR | AR | BR | AI | HM | Cm | P | LR | Tot-S | Tot-C | Cl | CaO | $Al_2O_3$ | $SiO_2$ |
| A | 0.8 | 1.94 | 5.82 | 2.7 | 2.27 | 1.37 | 1.18 | 0.50 | 1.87 | 5.95 | 2.88 | 4.40 | 45.6 | 7.4 | 16.9 |
| B | 0.77 | 1.96 | 2.07 | 2.55 | 2.90 | 1.37 | 1.09 | 0.49 | 1.90 | 4.37 | 9.51 | 10.69 | 40.1 | 5.4 | 15.7 |
| C | 0.77 | 1.96 | 2.07 | 2.55 | 2.90 | 1.37 | 1.09 | 0.49 | 1.90 | 4.37 | 9.51 | 10.69 | 40.1 | 5.4 | 15.7 |
| D | 0.82 | 1.96 | 2.07 | 2.71 | 2.91 | 1.47 | 1.16 | 0.48 | 2.02 | 4.26 | 9.27 | 10.43 | 41.6 | 5.3 | 15.3 |
| E | 0.94 | 1.96 | 2.07 | 3.11 | 2.91 | 1.73 | 1.34 | 0.49 | 2.31 | 4.02 | 8.74 | 9.84 | 44.9 | 5 | 14.5 |
| F | 0.91 | 1.73 | 2.07 | 3.08 | 2.57 | 1.60 | 1.29 | 0.49 | 2.21 | 4.34 | 9.44 | 10.62 | 42.4 | 5.4 | 13.8 |

TABLE 2-continued

Compositional ratios and weight percentages of raw clinker blends

| Blend | Ratios | | | | | | | | | Tot-S (%) | Tot-C (%) | Cl (%) | CaO (%) | Al₂O₃ (%) | SiO₂ (%) |
| --- | --- | --- | --- | --- | --- | --- | --- | --- | --- | --- | --- | --- | --- | --- | --- |
| | LSF | SR | AR | BR | AI | HM | Cm | P | LR | | | | | | |
| G | 0.90 | 1.77 | 2.11 | 3.05 | 2.61 | 1.74 | 1.28 | 0.85 | 2.20 | 2.52 | 11.37 | 12.41 | 42.8 | 5.4 | 14.1 |
| H | 0.61 | 1.74 | 2.15 | 2.07 | 2.55 | 1.20 | 0.87 | 1.48 | 1.49 | 1.87 | 15.14 | 9.99 | 36.4 | 6.9 | 17.6 |
| I | 0.82 | 1.75 | 2.10 | 2.78 | 2.59 | 1.53 | 1.17 | 0.71 | 2.01 | 3.18 | 11.30 | 11.79 | 40.7 | 5.7 | 14.6 |
| J | 0.98 | 1.77 | 2.08 | 3.30 | 2.62 | 1.84 | 1.39 | 0.63 | 2.39 | 3.19 | 10.20 | 12.83 | 43.6 | 5 | 13.2 |
| K | 0.97 | 1.75 | 2.05 | 3.27 | 2.61 | 1.69 | 1.37 | 0.44 | 2.36 | 4.54 | 8.57 | 12.62 | 42.3 | 5 | 12.9 |
| L | 0.89 | 1.75 | 2.08 | 3.01 | 2.60 | 1.60 | 1.26 | 0.55 | 2.17 | 3.85 | 9.95 | 12.20 | 41.5 | 5.3 | 13.8 |
| M | 0.95 | 1.75 | 2.10 | 3.20 | 2.59 | 1.80 | 1.35 | 0.71 | 2.31 | 2.99 | 10.64 | 11.11 | 44.1 | 5.3 | 13.8 |
| N | 1.02 | 1.75 | 2.08 | 3.46 | 2.60 | 1.89 | 1.46 | 0.55 | 2.50 | 3.63 | 9.37 | 11.49 | 44.9 | 5 | 13 |
| O | 0.54 | 1.74 | 2.18 | 1.83 | 2.54 | 1.13 | 0.76 | 4.82 | 1.32 | 0.62 | 17.62 | 9.24 | 35 | 7.5 | 19.1 |
| P | 0.93 | 1.69 | 1.94 | 3.16 | 2.57 | 1.18 | 1.31 | 0.21 | 2.27 | 8.87 | 3.92 | 11.96 | 38.1 | 4.7 | 12.1 |

FIG. 1 is the CAS ternary phase diagram displaying point-locations of blends in Table 2 after being normalized. To better assist subsequent clinkering, Differential Thermal Analysis (DTA) was carried out on raw clinker blends to map exothermic and endothermic occurrences during pyrolysis, ultimately aiding in devising the heat-treatment regimen. The exothermic peaks denoted the crystallization (or formation) of crystalline phases. Endothermic troughs were typically associated with calcination and the fusion (or melting) of the material. Identifying critical thermal occurrences helped better refine the clinkering process and improve firing efficiency. Prior to clinkering, the raw blends are formed into nodules using a nodulizer. The heat treatment takes place in a furnace optimally operating within the 1000-1100° C., as this range is equivalent to the peak operating temperature of most incinerator facilities. The final clinkered nodules are then pulverized to a near cement-like fineness.

Figure 2:
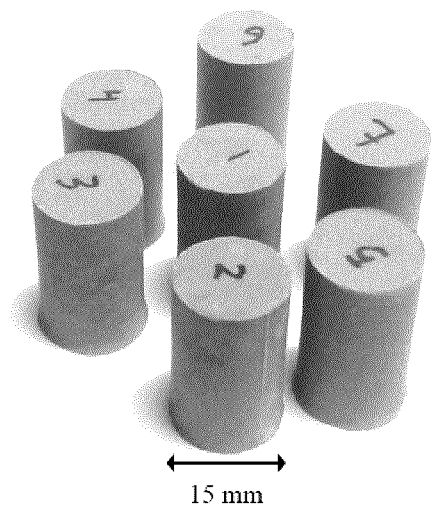
FIG. 2 Carbonation-hardened compacts prepared from clinker products.

Clinker Performance: Strength and $CO_2$ uptake. In order to assess the performance of the generated clinker products, a preliminary $CO_2$-reactivity test was carried out to quantify the strength and $CO_2$ uptake achieved after a two-hour carbonation. This test entailed casting cylindrical compacts (15 mm diameter, 30 mm height) from moistened clinker powder (w/c=0.15). Carbonation was carried out in an air-tight vessel using pure $CO_2$, and at a pressure of 22 psig. FIG. 2 shows hardened compacts after carbonation. Table 3 summarizes the carbonation results, giving average values for $CO_2$ uptake [(Δ weight÷initial weight×100%); water loss during carbonation also accounted for by collecting the vapor condensed on the chamber walls and adjusting the weight differential by adding the collected water weight to the initial weight of the compacts] and strength for each clinkered blend. Additional compacts were prepared and subject to subsequent hydration (water submersion) to test for a compounded strength effect stemming from latent hydraulic behavior. Blends A, B, and D displayed promising values for $CO_2$-activated strengths, but no further latent strength was observed. Conversely, Blend L showed weak $CO_2$ reactivity, but significant late-age hydraulic strength.

TABLE 3

Average values for $CO_2$ uptake and compressive strength for compacts prepared from different clinkered blends and subject to the following curing scenarios: 2-hour carbonation; 2-hour carbonation + 7-day hydration; and 2-hour carbonation + 28-day hydration.

| Blend | $CO_2$ Uptake (%) | Strength (MPa) | | |
| --- | --- | --- | --- | --- |
| | | 2-hour Carbonation | +7 day Hydration | +28 day Hydration |
| A | 6.8 | 53.0 | — | — |
| B | 8.9 | 56.2 | — | — |
| C | 6.8 | 36.9 | 42.9 | 51.1 |
| D | 7.8 | 49.4 | 52.5 | 53.0 |
| E | 7.1 | 23.0 | — | 34.6 |
| F | 5.8 | 38.2 | 39.0 | 34.5 |
| G | 2.5 | 9.7 | 30.2 | 36.4 |
| H | 4.7 | 19.3 | 20.0 | 24.6 |
| I | 6.8 | 34.5 | 41.2 | 42.5 |
| J | 3.0 | 8.5 | 26.7 | 33.4 |
| K | 3.3 | 16.7 | 26.7 | 55.2 |
| L | 3.4 | 12.1 | 28.9 | 62.6 |
| M | 2.1 | 10.5 | 39.0 | 48 |
| N | 4.3 | 35.4 | — | — |
| O | 4.7 | 27.0 | — | — |
| P | 3.7 | 31.6 | — | — |

Considering clinkered blends A, D, and L for further compositional and mineralogical insight, X-Ray Fluorescence (XRF) and quantitative X-Ray Diffraction (QXRD) were performed, respectively. Table 4 expresses elemental oxide compositions of the raw blends A, D, and L prior to clinkering. Table 5 identifies the mineralogical makeup of the clinkered blends before and after their carbonation. The mineralogy is somewhat convoluted due to the initial compositional complexity of the raw blends. The formation of $CO_2$-reactive, latent-hydraulic-reactive, and inert phases ensued as a result of clinkering. Table 6 summarizes the targeted and possible phase formations in the final ash-derived clinker product. The goal is to yield a final clinker product with a minimum of 45% of its weight consisting of a combination of $CO_2$-reactive and hydraulic phases. The minerals to meet such criteria are chloro-ellestadite (CE) and di-calcium-silicate ($C_2S$) phases. Early-age strength is achieved by the engagement of CE and, partially, $C_2S$ in a reaction with $CO_2$ during carbonation. Both phases are consumed to generate a binding composite matrix comprised of gypsum, calcium-carbonates, and amorphous C—S—H. This is associated with considerable strength gain after only short periods of carbonation. Prolonging carbonation curing to longer periods seems to induce a further spike in strength after a transitional dormant period. Compacts of such features achieved compressive strengths averaging above 50 MPa after only 2 hours of carbonation. The strength further spiked to values above 80 MPa after 12 hours of carbonation. This is mainly attributed to the engagement of the CE phase. While also $CO_2$-reactive, the $C_2S$ phase is also believed to be one primarily responsible for latent hydraulic strength. Due to the complex mineralogy of such clinker systems, certain phase interferences may arise that promote and/or thwart the strength gain mechanism.

TABLE 4

Composition of the raw blends A, D, and L.

| Oxide | Raw Blends | | |
|---|---|---|---|
| | A | D | L |
| $SiO_2$ | 16.89 | 15.33 | 13.79 |
| $TiO_2$ | 0.84 | 1.41 | 1.39 |
| $Al_2O_3$ | 7.44 | 5.27 | 5.31 |
| $Fe_2O_3$ | 1.28 | 2.54 | 2.56 |
| MnO | 0.06 | 0.19 | 0.19 |
| MgO | 5.43 | 1.67 | 1.76 |
| CaO | 45.57 | 41.59 | 41.47 |
| $Na_2O$ | 6.35 | 4.05 | 3.75 |
| $K_2O$ | 1.13 | 2.94 | 2.73 |
| $P_2O_5$ | 1.76 | 1.06 | 1.05 |
| Cl | 4.40 | 10.43 | 12.20 |
| S-Total | 5.95 | 4.26 | 3.85 |
| C-Total | 2.88 | 9.27 | 9.95 |

TABLE 5

Mineralogical make-up of clinkered blends A, D, and L, prior and post carbonation.

| Mineral phase | Empirical | Clinkered Blends | | | | | |
|---|---|---|---|---|---|---|---|
| | | A | | D | | L | |
| | | Clinker | Carb | Clinker | Carb | Clinker | Carb |
| Chloro-Ellestadite | $Ca_{10}(SiO_4)_3(SO_4)_3Cl_2$ | 28.7 | 16.6 | 43.8 | 19.6 | 49.8 | 27.8 |
| Di-calcium-silicate | $\alpha/\beta/\gamma\text{-}Ca_2SiO_4$ | 13.3 | 3.2 | 7.3 | 6.5 | 13.0 | 10.2 |
| Calcium Carbonate | $CaCO_3$ | — | 11.2 | — | 4.5 | — | 4.3 |
| Gypsum | $CaSO_4 \cdot (H_2O)_2$ | 1.2 | 10.6 | — | 6.2 | — | 2.5 |
| Wadalite | $Ca_6Al_5Si_2O_{16}Cl_3$ | 4.4 | 4.7 | 9.4 | 9.4 | 9.8 | 6 |
| Mayenite | $Ca_{12}Al_{14}O_{33}$ | 1.2 | — | — | — | — | — |
| Halite | NaCl | 5.1 | — | 4.9 | 4.7 | 5.1 | 4.9 |
| Sylvite | KCl | 1.3 | — | 2.9 | 1.9 | 2.0 | 1.9 |
| Bredigite | $(Ca,Ba)Ca_{13}Mg_2(SiO_4)_8$ | — | — | 8.0 | 8.0 | 3.8 | — |
| Akermanite | $Ca_2MgSi_2O_7$ | 10.9 | 11.9 | — | — | — | — |
| Gehlenite | $CaAl_2Si_2O_7$ | 8.8 | 7.1 | — | — | — | — |
| Quartz | $SiO_2$ | — | 0.7 | 0.5 | — | 0.4 | — |
| Anhydrite | $Ca(SO_4)$ | — | — | — | — | — | — |
| Ronderfite | $Ca_8Mg(SiO_4)_4Cl_2$ | — | — | — | — | — | — |
| Amorphous | undetectable | 25.1 | 34.0 | 23.8 | 39.3 | 16.1 | 42.4 |

TABLE 6

General mineralogical makeup of an MSW ash-derived clinker product listing target and possible phase formations.

| Mineral | | Target Range (wt. %) | Description |
|---|---|---|---|
| Chloro-Ellestadite | $Ca_{10}(SiO_4)_3(SO_4)_3Cl_2$ | 25-50 | $CO_2$ reactive, incorporates Cl and $SO_4$ |
| Di-calcium-silicate | $\alpha/\beta/\gamma\text{-}Ca_2SiO_4$ | 5-25 | CO2 reactive, and latent hydraulic |
| Wadalite/Mayenite | $Ca_6Al_5Si_2O_{16}Cl_3$/ $Ca_{12}Al_{14}O_{33}$ | 5-15 | Incorporates Cl |
| Ronderfite | $Ca_8Mg(SiO_4)_4Cl_2$ | 0-7 | Incorporates Cl |
| Halite/Sylvite | NaCl/KCl | 2-6 | Incorporates Cl |
| Akermanite/Gehlenite | $Ca_2MgSi_2O_7$/$CaAl_2Si_2O_7$ | 5-15 | |
| Bredigite | $(Ca,Ba)Ca_{13}Mg_2(SiO_4)_8$ | 5-15 | Solid solution of $Ca_2SiO_4$ and $Mg_2SiO_4$ |
| Anhydrite | $Ca(SO_4)$ | 1-7.5 | |
| Quartz | $SiO_2$ | 1-2 | |
| Amorphous | — | 10-30 | Undetectable |
| Phases generated by carbonation activation: | | | |
| Calcium Carbonate | $CaCO_3$ | 2-15 | Associated with a drop of $CO_2$ reactive phases |
| Gypsum | $CaSO_4 \cdot (H_2O)_2$ | 2-15 | Associated with a drop of $CO_2$ reactive phases |
| C—S—H | undetectable | — | Associated with a drop of $CO_2$ reactive phases. Generation reflected by an increase in amorphous content. |

Ellestadite belongs to the silicate sulfate apatite group of minerals, with variants distinguished by their end-members: OH (hydroxyl-ellestadite), F (Fluor-ellestadite), and Cl (chloro-ellestadite). Apatites in general have been noted for their ability to structurally accommodate a variety of atoms through lattice substitution, a feature that also makes them well suited for environmental remediation applications. Moreover, CE can serve as a promising host material for the containment of waste forms containing chlorides, sulfates, and heavy metals. Being conveniently rich in Ca, Si, S, and Cl, the raw clinker blends fit the compositional requisite for CE formation.

CE displayed a high specific reactivity to $CO_2$. While $C_2S$ was expectedly consumed to form reaction products C—S—H and $CaCO_3$, the depletion of CE seemed to be linked with the formation of gypsum. The results strongly suggested that the binding matrix generated in the carbonated clinkers comprised C—S—H and $CaCO_3$, but also included a gypsum component. Analyses also revealed the presence non-$CO_2$-reactive phases within the clinker, namely, wadalite, mayenite, gehlenite, and akermanite, to mention a few. These were seemingly unaffected by carbonation.

Figure 3:
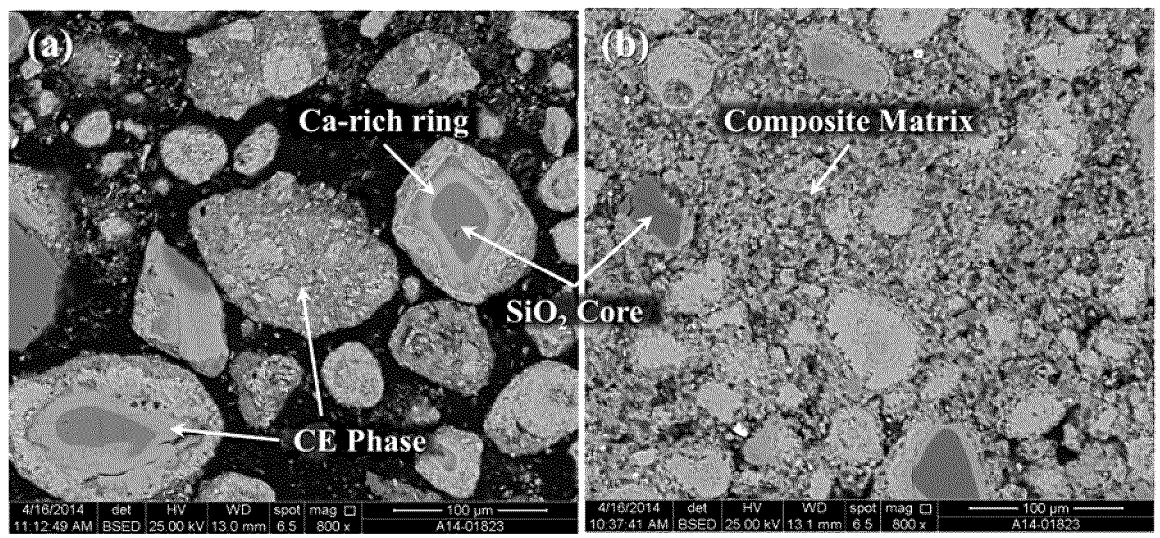
FIG. 3 Back-scattered SEM images of a typical clinker's microstructure prior (a), and post (b), carbonation activation.

Microstructure: Scanning electron microscopy (SEM) was employed to resolve morphological features pertaining to the hardened binding paste matrix. FIG. 3 reveals a typical clinker's microstructure prior, (a), and post, (b), carbonation. FIG. 3(a) shows individual clinker particles with some having revealed interiors. Since SEM micrographs were taken in back-scattered mode, the gradient in color suggested regions of varying atomic number. A particle characteristically displayed a Si-rich core surrounded by a thin region with a higher atomic value comprised of a mix of both Ca and Si. The outer shell was identified as CE. Belite (or $C_2S$) seemed more prevalent in the smaller size range of the clinker particles (<20 µm). FIG. 3(b) is a micrograph of the carbonated clinker specimen, displaying a highly consolidated morphology. Individual particles could not be observed since they transformed into the solidified binding medium. Clinker particles were heavily consumed and fused into a dense monolith medium occupying previously empty interstitial spaces between particles. This medium presented the binding phase, and was revealed to be a composite matrix consisting of C—S—H, $CaCO_3$, and gypsum.

Factsage® Simulation

Thermodynamic simulation of the multi-component phase equilibrium for the ternary waste-residues system is effected by FactSage® thermochemical software to optimize clinker synthesis. The simulation is meant to primarily assist in clinker synthesis, and also model the most suitable processing conditions for end-product quality consistency. The ultimate goal is to bear clinker products containing the highest possible weight fraction of target mineral phases that are $CO_2$-reactive, strength-contributing, and, to a lesser degree, latent hydraulic. The simulation helps develop specific ternary systems for incinerator residues (e.g. bottom ash, fly ash, and waste-lime), with a map of all possible phases that could be generated at clinkering temperatures between 1000-1100° C. for all different fractional combinations of residues. The simulated system will also incorporate the effect of additives, namely, $SiO_2$ and CaO. These are validated by experimental results.

The objective of this work is to develop a ternary system specific to an incinerator's solid waste streams (waste-lime, bottom ash and fly ash) to serve as a guide for final clinker phase prediction and manipulation through compositional adjustments, as well as detailing the effect of additives (CaO and $SiO_2$).

Figure 4:
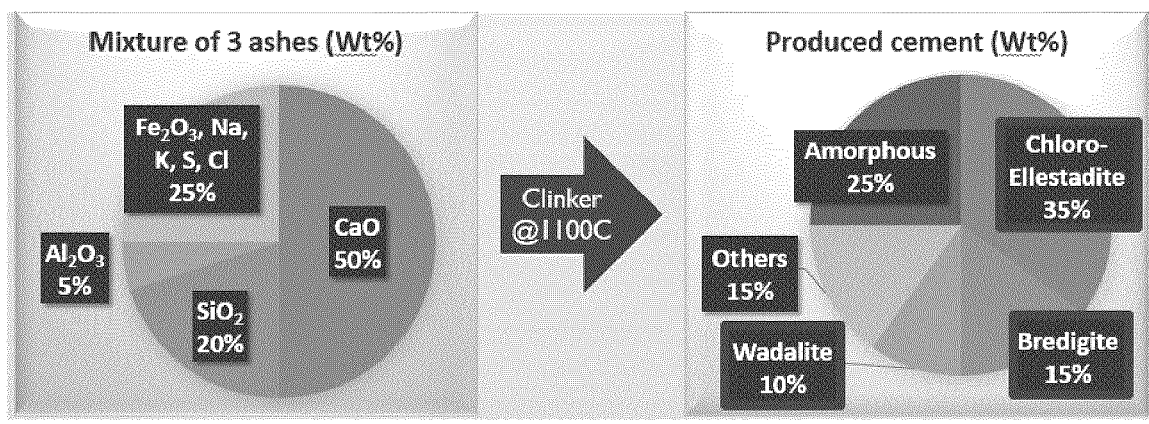
FIG. 4 Oxide input for the raw ash blend and FactSage's mineral phase distribution output for clinker generated at 1100° C.
Figure 5:
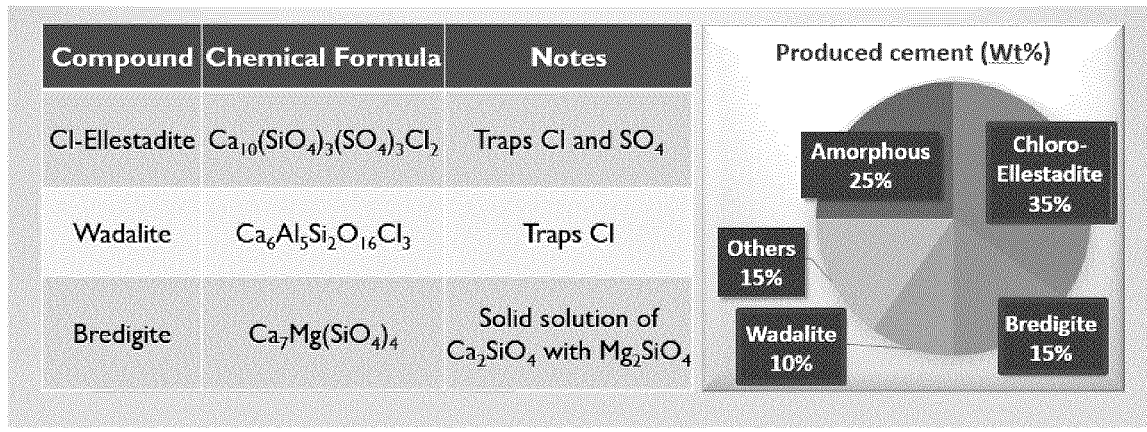
FIG. 5 FactSage's mineral phase distribution output.

FIG. 4 and FIG. 5 are outputs from FactSage for the simulated clinker system. Using one XRD result at 1:1:1 ratio of the 3 streams (orange point on FIG. 6), 66 points on the ternary diagrams (at 10 wt % intervals) were calculated on FactSage. The effects of $SiO_2$ and CaO additives were also examined at 0%, 2.5%, 5% and 7.5% additions. In total, 66*4*4=1,056 calculations were made and 64 ternary systems were generated for 4 types of phases; ellestadite, wadalite, bredigite and melilite. One example of the results shows that adding CaO can decrease the amount of bredigite formed. Moreover, FIG. 7 shows how increasing the CaO content shifts bredigite formation to the APC (waste-lime) vertex. Bredigite is a solid solution between $Ca_2SiO_4$ and $Mg_2SiO_4$. Higher basicity results in the formation of periclase (MgO), therefore, promoting the formation of desirable belite ($C_2S$) rather than bredigite during clinkering. An alternate approach would be to lower the cooling rate since bredigite is metastable below 970° C. and slow cooling will promote its decomposition to belite and merwinite.

Figure 6:
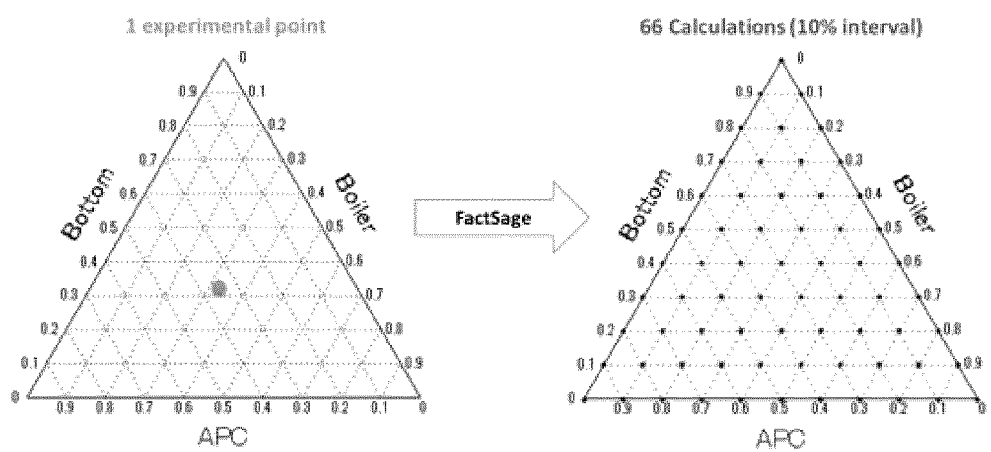
FIG. 6 illustrates FactSage phase diagram and calculation iterations.
Figure 7:
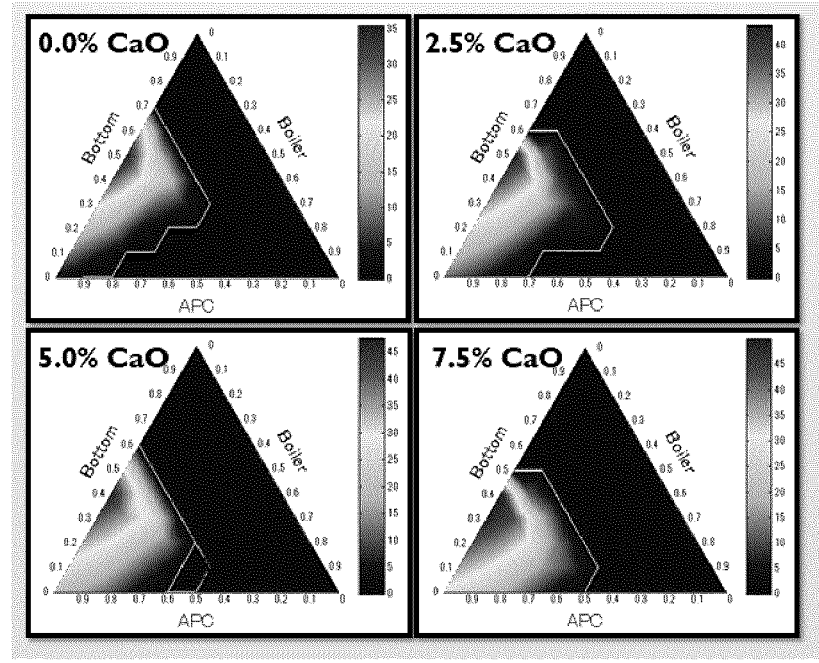
FIG. 7 FactSage illustration of the shift in Bredigite formation with incremental increases of CaO additive.

The ternary system represents all the possible mixing ratios of the 3 residue streams on a 2-D plot, as shown on FIG. 6, and its Z-axis (pointing out from the paper) can be selected as the amount of any phase of interest, such as bredigite, ellestadite and wadalite. Since generating this kind of ternary system from just experiments is not practical, FactSage thermochemical software is utilized. In order to do this, thermodynamic properties ($\Delta G$, $\Delta H$, S, and Cp) of all the forming phases need to be known. Since no experimental data exists in the database for the 2 chloride bearing minerals, ellestadite and wadalite, their thermodynamic properties have to be estimated from physical mineralogical analysis (XRF).

Practical Realization

Figure 8:
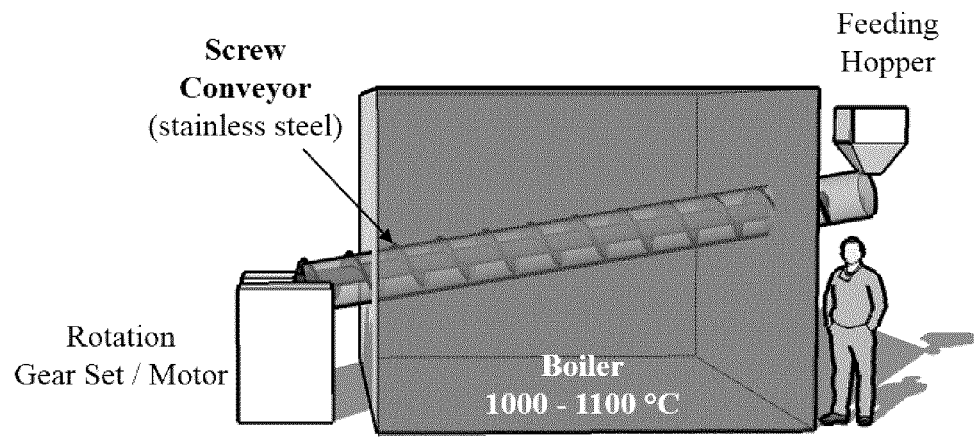
FIG. 8 Schematic illustration of pilot kiln installation within the upper combustion chamber or heat-recovery boiler assembly of an incinerator facility.
Figure 9:
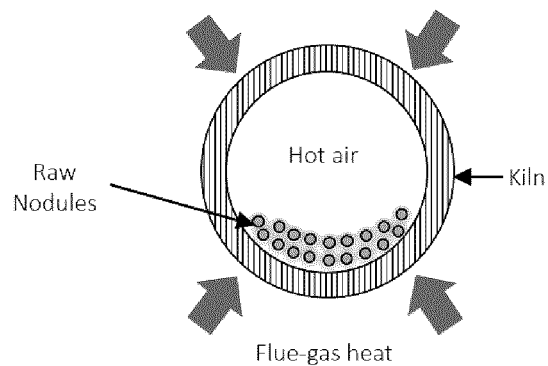
FIG. 9 Depiction of kiln's cross-section and energy recovery through convective/radiation heat transfer.

Since incineration is associated with considerable energy generation, transforming raw waste-ash blends into clinker products could be carried out in-situ. Energy needed for the clinkering heat-treatment can be locally sourced from an incinerator facility in the form of electricity, or heat directly recovered from combustion. FIG. 8 is a conceptual illustration of the latter. A kiln is embedded inside the combustion chamber closest to the heat-recovery boiler (HRB), where the temperatures normally range between 1000 and 1200° C. The kiln is stationary, but a rotating screw shaft controls the movement and residence time of the raw nodule feed. Heat is transferred from the hot flue gas to the nodules through convective and radiative heat transfer. To ensure efficient and homogenous clinkering, granular heat flow through a porous medium will need to be modelled. The porosity of the nodules and air voids in a typical charge will also need to be estimated. FIG. 9 illustrates a cross-sectional view of an embedded kiln. Clinkering kinetics is determined by the heat transfer rate.

II. Building-Units Production

Figure 10:
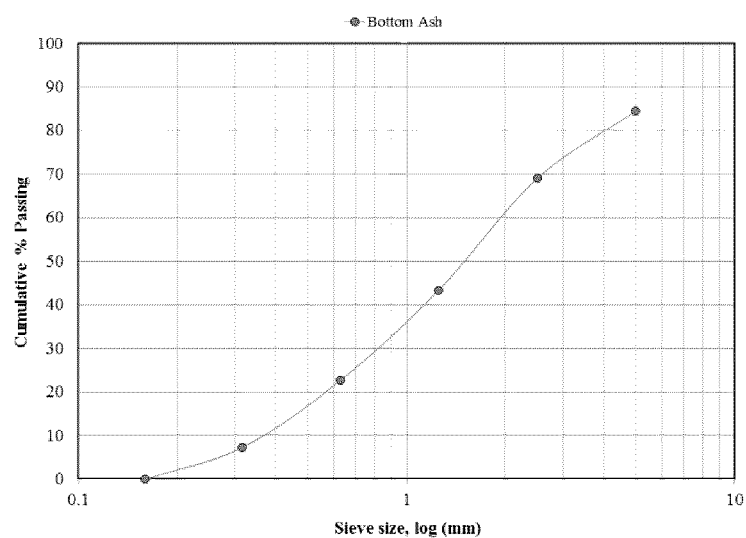
FIG. 10 illustrates particle size distribution of the graded bottom ash aggregate material.
Figure 11:
FIG. 11 illustrates graded bottom ash aggregates after washing (left) and after volatilization (right).

In parallel to the synthesis of clinker, bottom ash was also processed to be suitably primed for use as an aggregate material. The ash was dried in an oven at 105° C. for 24 hours, and then sieve-graded to fit the size distribution curve of FIG. 10. The bottom ash was then further stabilized by undergoing volatilization at 200° C. for 6-8 hours, which helped rid any residual organic content and other volatiles. This step is associated with a notable color change as can be seen in FIG. 11. The treated bottom ash was sieved again to meet the gradation criteria of FIG. 10. The primed ash can now be used as a lightweight aggregate for non-reinforced load-bearing and non-load-bearing precast products (pavers, interlocks, bricks, divider walls, masonry units). For demanding applications, partial replacement of the ash with natural stone can promote higher strength and load resistance.

Determining the specific gravity and absorption of the bottom ash product is a crucial requirement. This was carried out using absorption determination guidelines presented in ASTM C128 and C1761. When preparing building products, the aggregate absorption needs to be accounted for in order to maintain a constant water-to-binder ratio (w/b or w/c), as this parameter is critical for workability during mixing and strength after product hardening.

Figure 12:
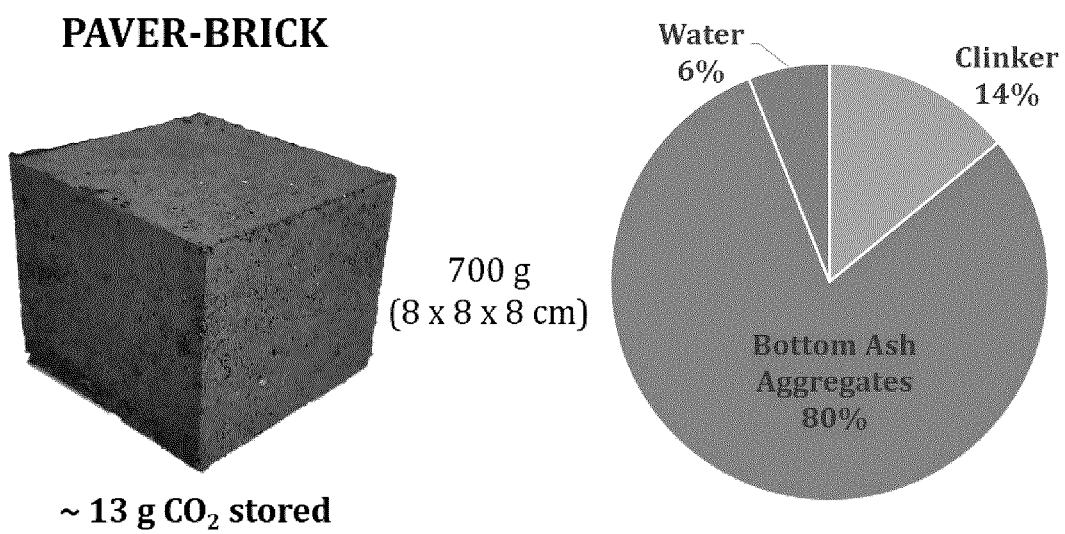
FIG. 12 illustrates paver/brick product prepared from ash-derived clinker and graded bottom ash aggregates.

For the purpose of demonstration, bricks of dimensions (8×8×8 cm) were casted. The bottom ash aggregate was mixed with ash-derived clinker (Part I) and water, and cast into cube molds. The mix design for this particular product was 14% clinker, 80% bottom ash aggregates, and 6% water, by mass (in other batches, clinker content was increased up to 25%). The bricks were immediately demolded after casting and allowed to sit in ambient conditions while monitoring their weight loss as a result of drying. This step could be expedited by improving aeration, for example by use of a fan. Drying was halted once the bricks experienced a mass loss equivalent to 35-45% the initial weight of mix water. The bricks were then subjected to carbonation curing, which was carried out in an air-tight pressure vessel using 99% purity $CO_2$ gas and under a pressure of 20 psig for two hours. FIG. 12 is an image of such brick. Each brick prepared sequestered a total of 13 g $CO_2$, equivalent to 13-15% the weight of initial clinker content. The average compressive strength of these preliminary trials yielded values in the vicinity of 12 MPa. The pavers were manually compacted using a vibrating hammer. Subsequent trials achieved higher strengths due to higher clinker loading, better mixing, and higher compaction force during casting. Other considerations to promote physical durability include increasing carbonation duration, using blended clinker-cement binder, and using natural stone to partially replace bottom ash aggregates.

If the above is to be implemented by an incinerator, the benefits are aplenty. Not only will an operator solve the problem of ash containment and associated landfill tipping fees, but benefits could also include the creation of a potential revenue stream from the sale of brick products, and the diversion of carbon from the atmosphere by using emission-sourced $CO_2$ for the curing step. Table 7 presents an example of an economic breakdown for a medium-sized incinerator facility with a processing capacity of 180,000 tons MSW/year if it were to adopt the prescribed methodologies presented by this specific example. Approximately 8,000 tons of ash-derived clinker could potentially be produced per year. Combined with the utilization of 44,800 tons of bottom ash, all waste-ash residues could hypothetically be consumed at point source. A total of 80 million bricks of dimensions 8×8×8 cm can be produced annually, associating a total $CO_2$ sequestration capacity of around 1,000 tons of $CO_2$, and a possible revenue stream from brick sale once validated to meet requisites for a targeted building application.

TABLE 7

Economic breakdown of a medium-sized incinerator if it were to adopt the prescribed methodologies of this invention.
Annual Economic Breakdown

| Ash-derived clinker | Production (tons/year) |
|---|---|
| | ~8,000 |

TABLE 7-continued

Economic breakdown of a medium-sized incinerator if it were to adopt the prescribed methodologies of this invention.
Annual Economic Breakdown

| Annual Paver Production (based on 14% cement/brick) | # of pavers (units/year) ~80,000,000 |
| Annual $CO_2$ Uptake (13 g $CO_2$ uptake/block)* | $CO_2$ Uptake (tons/year) 1,040 |
| Bottom Ash as sand replacement (0.56 Kg/unit)** | Bottom Ash used (tons/year) 44,800 |
| Potential Revenue (assume $0.10/unit) | Annual Revenue ($/year) 8 Million |

*Assuming an $CO_2$ uptake of 13% by weight of cement
**Assuming a bottom ash aggregate loading of 80 wt. % of a block Collection of Ashes and Product Synthesis Demonstrations Incineration residues were collected from two different sources to investigate the effect of compositional variation on clinker production. The first source was the Quebec City MSW Incinerator (Example 1) and the second was the Emerald Energy-from-waste (EFW) incinerator facility (Example 2). Fly ash and waste-lime were the two residue sources from the Quebec City incinerator used for clinker synthesis. Three ashes were used for the Emerald EFW demonstration: waste lime (primary CaO source), fly ash (source for CaO, $Al_2O_3$ and $SiO_2$), and bottom ash (secondary CaO, $Al_2O_3$ and $SiO_2$ source). Guided stoichiometric combination ensured relative consistency in clinker production. Although the incineration processes of the two facilities are quite different, the ash mixtures prepared displayed compositional relationships within the same order of magnitude. Clinker formulations with minimal to no natural raw additives were generated.

The present invention will be more readily understood by referring to the following examples which are given to illustrate the invention rather than to limit its scope.

Example 1

Quebec City Municipal Incinerator Residues

Composition and Raw Clinker Preparation

Figure 13:
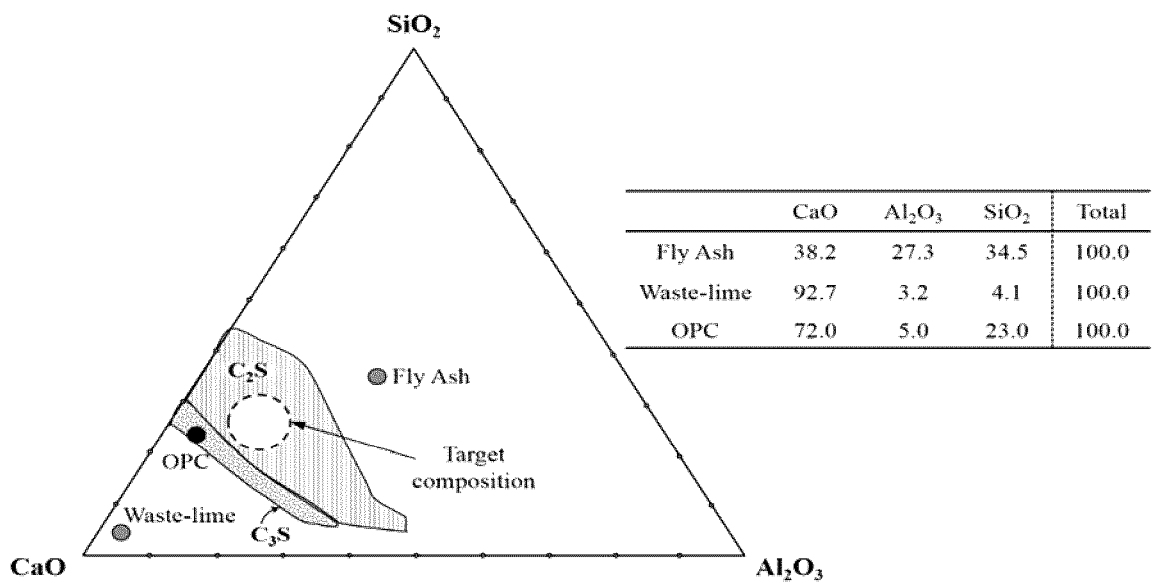
FIG. 13 illustrates a general CaO—Al$_2$O$_3$—SiO$_2$ (CAS) ternary system indicating target clinker composition with locations for the normalized compositions of the fly ash, waste-lime, and commercial OPC.

Compositions of the residues from the Quebec City incinerator were determined using X-Ray Fluorescence (XRF), shown in Table 8. FIG. 13 shows the normalized locations of these residues on the CaO—$Al_2O_3$—$SiO_2$ (CAS) ternary phase diagram, and also indicates the target composition for the raw clinker mix. The latter choice was based on the premise of forming $CO_2$-reactive phases upon heating with the most feasible ingredient manipulation so that the least amounts of virgin additives are used. After numerous trials, the final stoichiometric composition for the raw clinker powder was 86 wt. % fly ash and waste-lime residues (one-to-one weight distribution), and supplemented by hydrated lime (9 wt. %) and silica sand (5 wt. %). The raw clinker had a lime-saturation factor (LSF or % CaO/[(2.8× % $SiO_2$)+(1.2× % $Al_2O_3$)+(0.65× % $Fe_2O_3$)]), silica ratio (SR or % $SiO_2$/[(% $Al_2O_3$+% $Fe_2O_3$)]), and alumina ratio (AR or % $Al_2O_3$/% $Fe_2O_3$) values of 0.80, 1.93, and 5.84, respectively.

TABLE 8

Chemical compositions and LOI of MSW incinerator residues, fly ash and waste-lime, and the resulting raw clinker.
Composition wt % (DL = 0.01%)

| Oxide | Fly Ash | Waste-lime | Raw Clinker mix |
|---|---|---|---|
| $SiO_2$ | 18.28 | 1.79 | 16.89 |
| $TiO_2$ | 1.76 | 0.03 | 0.84 |
| $Al_2O_3$ | 14.47 | 1.43 | 7.44 |
| $Fe_2O_3$ | 2.30 | 0.43 | 1.28 |
| MnO | 0.09 | 0.03 | 0.06 |
| MgO | 6.73 | 4.86 | 5.43 |
| CaO | 20.23 | 41.11 | 45.57 |
| $Na_2O$ | 12.66 | 0.91 | 6.35 |
| $K_2O$ | 2.21 | 0.20 | 1.13 |
| $P_2O_5$ | 3.50 | 0.26 | 1.76 |
| $Cr_2O_3$ | 0.10 | <DL | 0.05 |
| $V_2O_5$ | <DL | <DL | <DL |
| Total-C | 2.09 | 4.06 | 2.88 |
| Total-S | 1.95 | 10.75 | 5.95 |
| Cl | 3.54 | 5.85 | 4.40 |
| LOI | 18.37 | 16.48 | — |

Differential Thermal Analysis (DTA)

Figure 14:
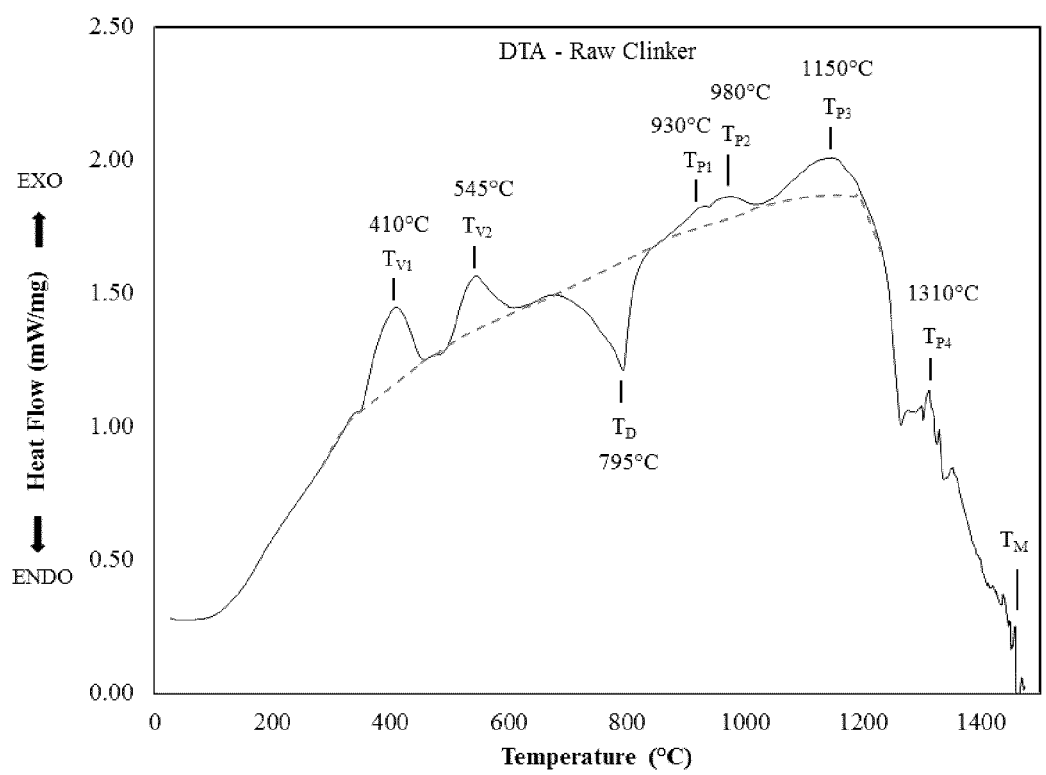
FIG. 14 illustrates a differential Thermal Analysis (DTA) for the raw clinker blend.

DTA was carried out on the raw clinker blend to map exothermic and endothermic occurrences during pyrolysis, which ultimately aided in devising the clinkering regimen. The results from DTA are presented in FIG. 14, where peaks indicate exothermic events, and troughs endothermic ones. The first two exothermic peaks are attributed to the burning of volatilizable components. The endothermic dip at 795° C. was the result of the calcination of the carbonate component of the raw blend. The remaining exothermic peaks denoted the crystallization, or formation, of crystalline phases. The general endothermic decline starting at 1200° C. signifies melting, which prolongs till 1460° C. until the complete fusion of the material.

Figure 15:
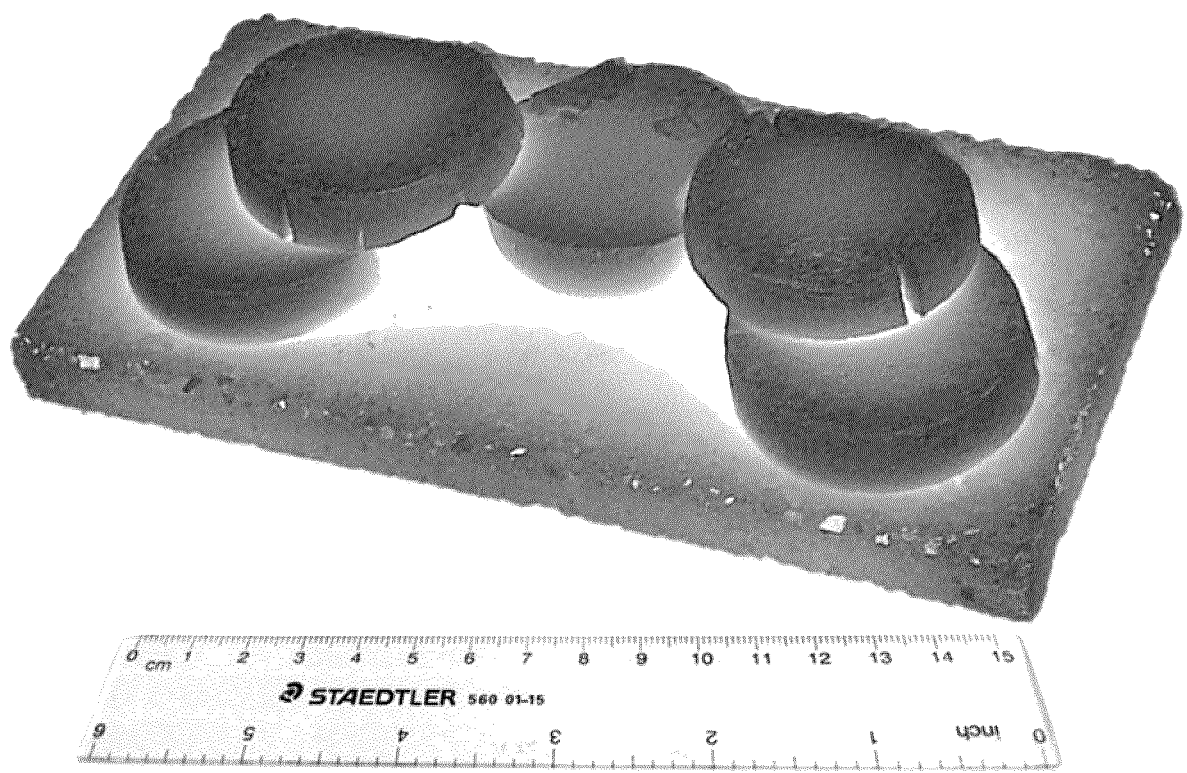
FIG. 15 illustrates heat treated clinker discs prior to cooling and pulverizing into powder.

Based on these findings, clinkering heat treatments were devised. A total of five temperatures were chosen: 1000, 1100, 1200, 1250, and 1300° C., all of which were below conventional clinkering temperatures of OPC (~1500° C.). The purpose of this selection was to sample clinker material generated at different temperatures within the range 900-1300° C. This was where most critical phase crystallizations occurred. Temperatures beyond 1300° C. were not considered as this study was more interested in the synthesis of a low-energy binder material. After the respective clinker discs completed their heat treatments, they were immediately quenched in water to simulate rapid cooling in an effort to fix clinker phases in a metastable state and avoid their regression. FIG. 15 is that of a clinkered batch immediately after being retrieved from the furnace and before being quenched. The cooled and dried discs from each batch were then pulverized to near cement-like fineness to obtain final clinker powders.

Clinker Performance: Strength & $CO_2$ Uptake

Figure 16:
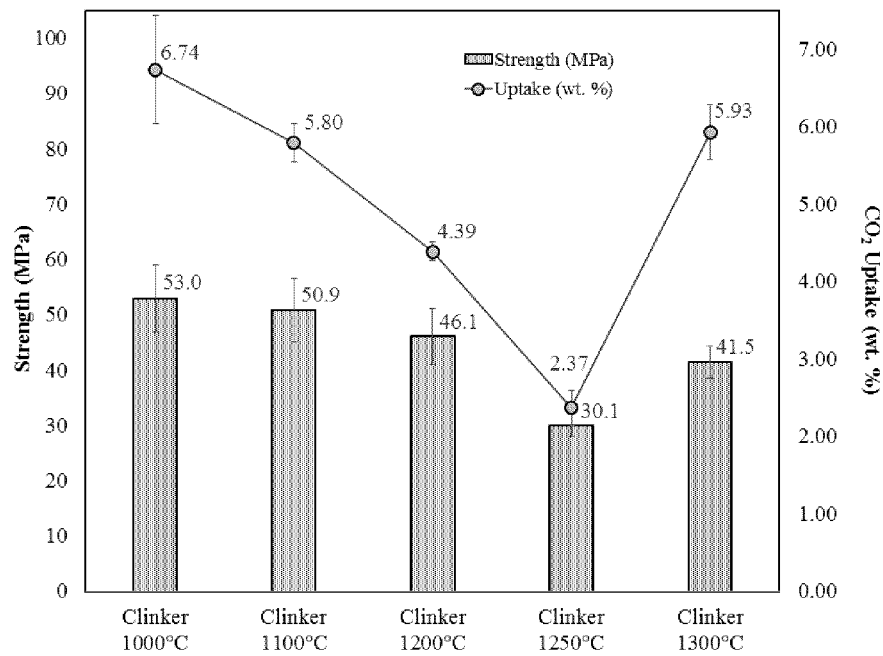
FIG. 16 illustrates compressive strength and CO$_2$ uptake for carbonated compacts prepared from the different clinker powders.

Cylindrical compacts (15 mm diameter, 30 mm height) where prepared by mixing the clinker with water at a water-to-clinker (w/c) ratio of 0.15. These were subject to a 2-hour carbonation at 1.5 bar using pure $CO_2$ gas, and then tested for weight gain and compressive strength, the results of which are plotted in FIG. 16. Compressive strength was also tested for compacts that had alternatively underwent hydraulic curing for duration varying from 2 hours to 28 days. The hydraulic strength of the different clinkers can be seen in FIG. 17.

Figure 17:
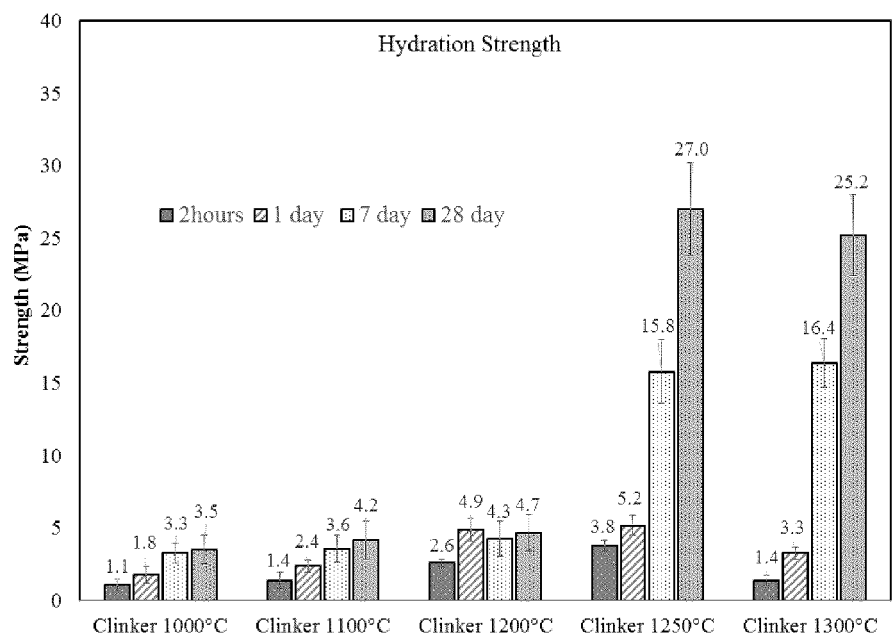
FIG. 17 illustrates compressive strength for different clinker compacts hydrated up to 28 days.

The highest binding strength was displayed by the carbonated Clinker-1000° C. material. Lower temperatures seemed to favor the formation of phase(s) with higher $CO_2$-reactivity (possibly formed at crystallization temperatures $T_{P1}$ and $T_{P2}$ in FIG. 14).The relationship between strength and $CO_2$ uptake were quite correlative; as a decrease in strength associated a decrease in uptake, and vice versa. Only above a clinkering temperature of 1200° C. was hydraulic strength first observed, as shown in FIG. 17. This observation strongly suggested that phases with latent hydraulic character only formed in Clinker-1250° C. and Clinker-1300° C., implying the possible crystallization of β-$C_2S$.

Figure 18:
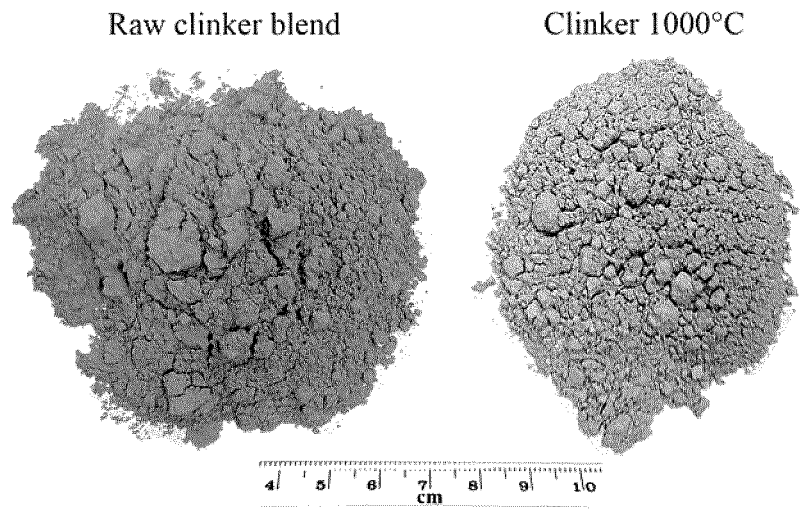
FIG. 18 illustrates raw clinker blend before and after clinkering heat treatment at 1000° C.

Clinker-1000° C. was the binder considered for further investigation, as, in addition to displaying the highest $CO_2$ reactivity, its synthesis associated the lowest embodied energy and carbon footprint. The consolidation of this clinker however could only be achieved via carbonation-activation. FIG. 18 shows the Clinker-1000° C. before and after clinkering. Table 9 presents the compositional make-up of this clinker.

TABLE 9

Chemical compositions of Clinker-1000° C.
Clinker 1000° C.

| Oxide | Weight % |
|---|---|
| $SiO_2$ | 19.78 |
| $TiO_2$ | 1.30 |
| $Al_2O_3$ | 5.33 |
| $Fe_2O_3$ | 1.51 |
| MnO | 0.07 |
| MgO | 1.83 |
| CaO | 47.59 |
| $Na_2O$ | 4.33 |
| LOI | 3.26 |
| $K_2O$ | <DL |
| $P_2O_5$ | 1.29 |
| $Cr_2O_3$ | 0.11 |
| $V_2O_5$ | 0.01 |
| Total-C | 0.92 |
| Total-S | 5.14 |
| Cl | 4.23 |

Characterization: Mineralogy

Figure 19:
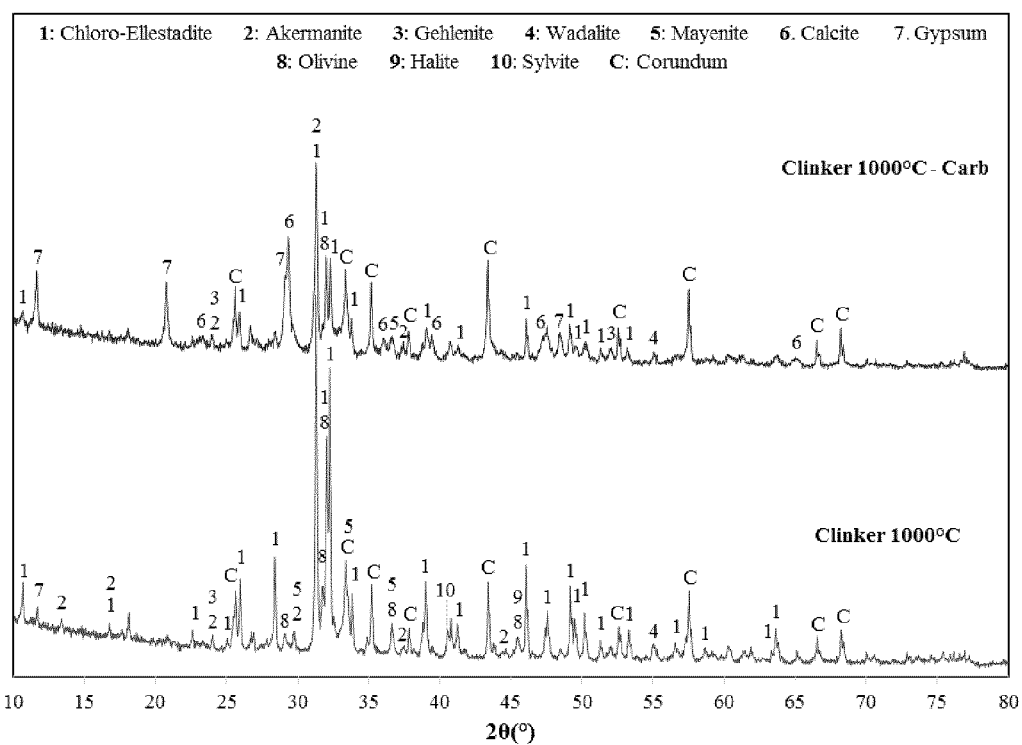
FIG. 19 illustrates x-ray diffractograms for the low-energy clinker prior and post carbonation activation (Corundum used as internal reference for quantitative analysis).
Figure 20:
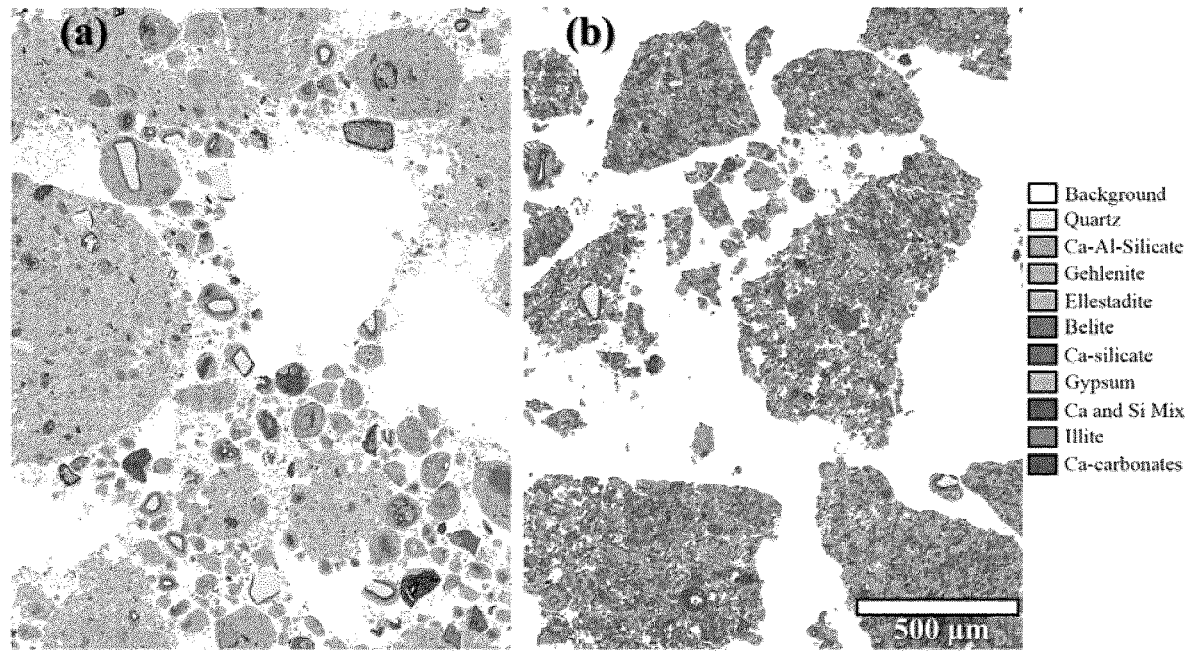
FIG. 20 illustrates QEMSCAN Field Scan (FS) mode mapping powder samples of Clinker-1000° C. prior and post carbonation activation.

Two techniques were employed for the mineralogical characterization of the clinker product: QXRD (Quantitative X-Ray Diffraction) and QEMSCAN (Quantitative Evaluation of Minerals by Scanning Electron Microscope). These analyses were also performed on the carbonation-activated clinker. While broadly in agreement, the two materials differed in their expression of phase distribution. QXRD (FIG. 19) identified phases in weight percent; QEMSCAN (FIG. 20) listed its detected phases in volume percent.

Table 10 is a summary of the detected phases by QXRD. The major $CO_2$-reactive phases identified were chloro-ellestadite (CE) and γ-$C_2S$, with CE more predominant. Upon carbonation, these phases were respectively reduced to 58% and 24% of their initial weight fractions. These reductions were equally met with spikes in the contents of calcite, gypsum, and the amorphous phase.

Ellestadite belongs to the silicate sulfate apatite group of minerals, with variants distinguished by their end-members: OH (hydroxyl-ellestadite), F (Fluor-ellestadite), and Cl (chloro-ellestadite). Apatites in general have been noted for their ability to structurally accommodate a variety of atoms through lattice substitution, a feature that also makes them well suited for environmental remediation applications. Moreover, CE can serve as a promising host material for the containment of waste forms containing chlorides, sulfates, and heavy metals. Being conveniently rich in Ca, Si, S, and Cl, the raw clinker blend fit the compositional requisite for CE formation. Since clinkering was performed at 1000° C., $T_{P1}$ or $T_{P2}$ most likely marked the peak crystallization temperature (FIG. 14) associated with the formation of this phase.

CE displayed a high specific reactivity to $CO_2$. While $\gamma$-$C_2S$ was expectedly consumed to form reaction products C—S—H and $CaCO_3$. The depletion of CE seemed to be linked with the formation of gypsum. The results strongly suggested that the binding matrix generated in the carbonated Clinker-1000° C. comprised C—S—H and $CaCO_3$, but also included a gypsum component. A similar observation was reflected in Table 11, and also visually depicted in the field scans of FIG. 20. The analyses also revealed the presence of non-$CO_2$-reactive phases within the clinker, namely, wadalite, mayenite, gehlenite, and akermanite. These were seemingly unaffected by carbonation.

TABLE 10

Quantitative phase analysis via QXRD for Clinker-1000° C., as-synthesized and after undergoing carbonation activation.
Quantitative X-Ray Diffraction (Wt. %)

| Mineral | Compound | Clinker 1000° C. | Clinker 1000° C. Carbonated |
|---|---|---|---|
| Chloro-Ellestadite | $Ca_{10}(SiO_4)_3(SO_4)_3Cl_2$ | 28.7 | 16.6 |
| Calcio-olivine | $\gamma$-$Ca_2SiO_4$ | 13.3 | 3.2 |
| Akermanite | $Ca_2MgSi_2O_7$ | 10.9 | 11.9 |
| Gehlenite | $Ca_2Al_2SiO_7$ | 8.8 | 7.1 |
| Wadalite | $Ca_6Al_5Si_2O_{16}Cl_3$ | 4.4 | 4.7 |
| Mayenite | $Ca_{12}Al_{14}O_{33}$ | 1.2 | n.d. |
| Quartz | $SiO_2$ | trace | 0.7 |
| Calcite | $CaCO_3$ | n.d. | 11.2 |
| Halite | NaCl | 5.1 | n.d. |
| Sylvite | KCl | 1.3 | n.d. |
| Gypsum | $CaSO_4 \cdot 2(H_2O)$ | 1.2 | 10.6 |
| X-ray insensitive | Amorphous | 25.1 | 34.0 |

TABLE 11

QEMSCAN - Bulk Mineralogical Analysis (BMA) for powder samples of as-synthesized and carbonated Clinker-1000° C.
QEMSCAN - Bulk Mineralogical Analysis, Vol. %

| Mineral | Compound | Clinker 1000° C. | Clinker 1000° C. Carbonated |
|---|---|---|---|
| Quartz | $SiO_2$ | 1.32 | 1.19 |
| Calcite | $CaCO_3$ | 0.73 | 13.63 |
| Gypsum | $CaSO_4 \cdot 2(H_2O)$ | 1.21 | 9.39 |
| Belite | $Ca_2SiO_4$ | 5.94 | 1.62 |
| Wadalite | $Ca_6Al_5Si_2O_{16}Cl_3$ | 3.17 | 3.37 |
| Ellestadite | $Ca_{10}(SiO_4)_3(SO_4)_3Cl_2$ | 51.16 | 11.34 |
| Gehlenite/ akermanite | $Ca_2Al_2SiO_7$/$Ca_2MgSi_2O_7$ | 22.05 | 21.57 |
| Mayenite | $Ca_{12}Al_{14}O_{33}$ | 4.06 | 5.56 |
| Halite | NaCl | 3.70 | 2.21 |
| Mixed Ca and Si | — | 2.24 | 26.41 |
| Other | — | 2.79 | 2.23 |
| Unclassifiable | — | 1.63 | 1.48 |

Microstructure

FIG. 3 reveals the clinker's microstructural morphology prior and post carbonation. Polishing was able to shear off some cross-sections, which helped reveal these particles' interiors. Since SEM micrographs were taken in backscattered mode, the gradient in color suggested regions of varying atomic number. Assisted by field scans from FIG. 20, a particle characteristically displayed a Si-rich core surrounded by a thin region of high atomic character comprised of a mix of both Ca and Si. Moving outward, a diffuse region of lower atomic intensity made up the remaining portion of the cross-section. This latter region, which also encompassed the outer shell of the particles, was identified as the CE phase according to the color assignment in FIG. 20. Belite seemed more prevalent in the smaller size range of the clinker particles (<20 μm).

FIG. 3(b) is a micrograph of the carbonated clinker specimen, displaying a highly consolidated morphology. Individual particles could not be observed since they transformed into the solidified binding medium. The probed surface had evidently experienced considerable reaction during carbonation. Sharp particle contours were no longer observable. The clinker phase(s) seemed heavily consumed and fused into a dense monolith medium that occupied interstitial spaces between particles. This medium presented the binding phase, which was revealed to be a composite matrix consisting of C—S—H, $CaCO_3$, and gypsum.

Environmental Leaching Performance

Preliminary environmental assessment was conducted on the synthesized clinker in its raw, clinkered, and clinkered-carbonated form, and the leaching results are summarized in Table 12. The adopted EPA test methods (TCLP and SPLP) simulated exposure conditions that varied in severity. All heavy metal concentrations measured in the respective leachates were well below regulatory limits. Therefore, comparative performance analysis for the different clinker forms proved inconsequential. According to the tested criteria, all forms satisfy conditions that deem them stable.

TABLE 12

TCLP and SPLP results comparing leaching behavior of the raw clinker blend to its heat-treated form, both before and after carbonation.
Leaching Performance (mg/L)

| Heavy Metal | DL | Raw Clinker | | Clinker 1000° C. | | Carbonated Clinker 1000° C. | | Regulatory Limit (mg/L) |
|---|---|---|---|---|---|---|---|---|
| | | SPLP | TCLP | SPLP | TCLP | SPLP | TCLP | |
| As | 0.10 | ND | ND | ND | ND | ND | ND | 5.0 |
| Ba | 0.50 | 1.1 | 1.5 | ND | 0.8 | ND | 0.6 | 100.0 |
| Cd | 0.01 | 0.03 | 0.06 | ND | ND | ND | ND | 1.0 |
| Cr | 0.10 | 0.2 | 0.3 | 2.4 | 3.4 | 1.4 | 1.6 | 5.0 |
| Pb | 0.01 | 0.03 | 0.14 | ND | ND | ND | ND | 5.0 |
| Se | 0.10 | ND | 0.1 | ND | ND | ND | ND | 1.0 |

TABLE 12-continued

TCLP and SPLP results comparing leaching behavior of
the raw clinker blend to its heat-treated form, both before and after carbonation.
Leaching Performance (mg/L)

| Heavy Metal | DL | Raw Clinker | | Clinker 1000° C. | | Carbonated Clinker 1000° C. | | Regulatory Limit (mg/L) |
|---|---|---|---|---|---|---|---|---|
| | | SPLP | TCLP | SPLP | TCLP | SPLP | TCLP | |
| Ag | 0.01 | ND | ND | ND | 0.13 | ND | ND | 5.0 |
| Hg | 0.002 | ND | ND | ND | ND | ND | ND | 0.2 |

SPLP: Synthetic Precipitation Leaching Procedure (EPA Method 1312)
TCLP: Toxicity Characteristic Leaching Procedure (EPA Method 1311)
ND = Not-detected Application of Clinker in Concrete For the projected end-use of this study's binder, concrete slabs were prepared and consolidated via carbonation. Their strength was compared to identical slabs prepared using OPC. Table 13 summarizes average compressive strength results recorded for batches of different binder/aggregate combinations. Respective $CO_2$ uptakes are also listed in the table for the carbonated slabs. These weight fractions presented the mass of $CO_2$ gas taken up by a slab with respect to its initial cement content.

The strength achieved by the clinker-based slabs after only 2 hours of carbonation was three times the strength of OPC concrete hydrated for 1 day, and 75% that of OPC concrete hydrated for 28 days. This rapid gain in strength superseded early-age requisites, and also compared reasonably well with the ultimate strength that could be achieved by the benchmark-equivalent slabs.

TABLE 13

Summary of compressive strength and $CO_2$ uptake for differently cured 2"
masonry concrete specimens prepared using different binders
2" Masonry Concrete Slabs, Strength/$CO_2$ Uptake

| | Carbonation (2 hours @ 22 psi)** | | Hydration (RH = 100%) | |
|---|---|---|---|---|
| Binder/Aggregate | 1-day Strength (MPa) | Uptake (%)*** | 1-day Strength (MPa) | 28-day Strength (MPa) |
| ① OPC/Granite* | 23.8 ± 1.9 | 17.7 ± 0.5 | 5.2 ± 0.6 | 24.2 ± 2.4 |
| ② Clinker/Granite | 17.9 ± 0.6 | 10.2 ± 0.2 | — | — |

*Represents commercial benchmark concrete
**Preceded by ambient pre-drying to achieve 40-50% loss of mix water
***g $CO_2$/g binder (%)

Extra Parametric Clinker Trials

Additional experimental trials were conducted to investigate the effect of clinkering temperature, clinkering durations, and cooling method on $CO_2$ reactivity and strength of compact specimens. The different trials and their results are presented in Table 14. The cooling rate was varied by changing the method by which the hot clinker was brought to room temperature. The four cooling methods were: in-furnace cooling (slow), air cooling (moderate), freezer cooling (rapid), and water quenching (instantaneous). Certain trials underwent hybrid cooling, where clinker was allowed to cool in the furnace until a certain temperature, and then water quenched.

TABLE 14

The effect of different processing parameters on the $CO_2$
reactivity of the clinker product.

| Clinkering Temperature | Duration | Cooling method | CO2 uptake (%) | Strength (MPa) |
|---|---|---|---|---|
| 1000° C. | 1 hr | in furnace | 6.74 | 53 |
| 1100° C. | 1 hr | in furnace | 5.8 | 50.9 |
| 1200° C. | 1 hr | in furnace | 4.4 | 46.1 |
| 1250° C. | 1 hr | in furnace | 2.4 | 30.1 |
| 1300° C. | 1 hr | in furnace | 5.93 | 41.5 |
| 1150° C. | 1 hr | air | 5.4 | 42.3 |
| 1150° C. | 1 hr | freezer | 4.1 | 34.3 |
| 1150° C. | 1 hr | water quench | 7.9 | 62.3 |
| 1100° C. | 0.5 hr | air | 1.3 | 5.8 |
| 1000° C. | 0.5 hr | freezer | 2.1 | 21.1 |
| 1200° C. | 0.5 hr | water quench | 2.7 | 27.8 |
| 1250° C. | 0.5 hr | air | 3 | 27.7 |
| 1250° C. | 1 hr | freezer | 5.5 | 45 |
| 1250° C. | 1 hr | water quench | 5.5 | 45 |
| 1220° C. | 1 hr | water quench | 5 | 45 |
| 1150° C. | 1 hr | water quench (800 C.) | 5.1 | 58 |
| 1000° C. | 1 hr | air | 5.5 | 52 |
| 1000° C. | 1 hr | water quench | 7.6 | 51 |
| 1150° C. | 1 hr | water quench | 6 | 62 |
| 1150° C. | 1 hr | air | 5.3 | 56 |
| 1250° C. | 1 hr | air | 4.2 | 58 |
| 1000° C. | 0.5 hr | water quench (1000 C.) | 5.1 | 29.6 |
| 1000° C. | 2 hr | water quench (800 C.) | 6 | 53 |
| 1000° C. | 1 hr | water quench (800 C.) | 5.9 | 56 |
| 1000° C. | 1 hr | water quench (800 C.) | 3.8 | 42 |
| 1000° C. | 1 hr | water quench (800 C.) | 4.9 | 44 |

Clinkering temperatures of 1000, 1100, and 1150° C. displayed consistently high $CO_2$ reactivity and strength gain.

Clinkering durations of 1 hour seem to be sufficient for the complete crystallization of desired reactive mineral phases. From simple physical resilience observations, limiting the heat treatment to 0.5 hours corresponded to lower binding strengths. On the other hand, increasing firing treatment to 2 hours displayed no significant difference in clinker performance.

Cooling by water quenching associated slightly better performance than equivalent clinkers cooled by the different techniques mentioned. However, the improvements were marginal, thus making the choice of cooling better arbitrated by considerations related to practical implementation.

Example 2

Emerald Energy-from-Waste Incinerator Residues, Brampton, Ontario

Composition and Clinker Preparation

Figure 21:
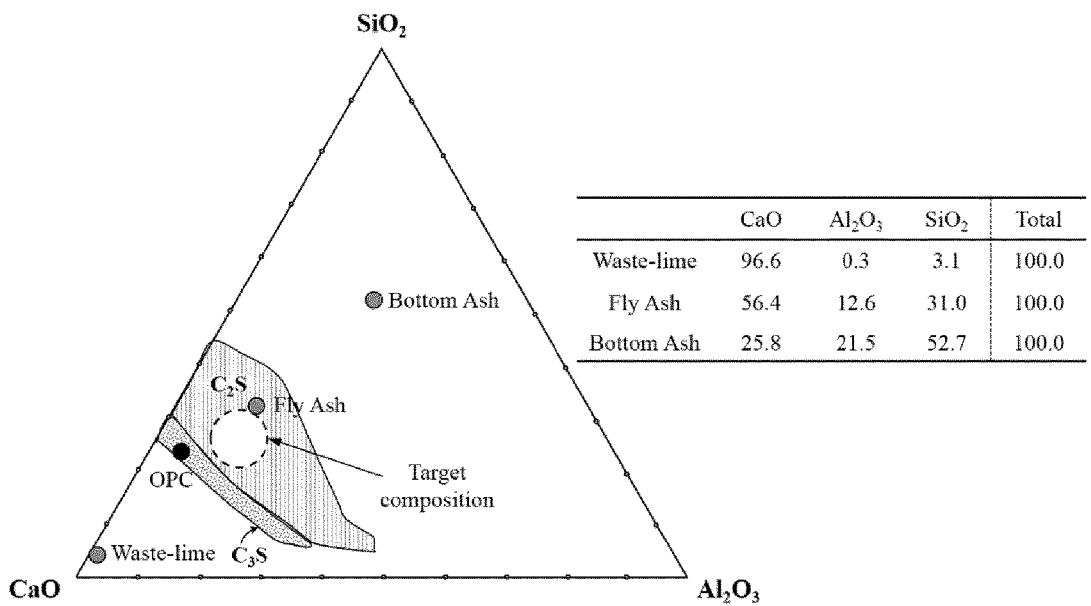
FIG. 21 illustrates CAS ternary system indicating compositional locations of the three normalized residues and the target clinker composition.

Similar to Example 1, compositions of the residues collected from the Emerald Energy-from-Waste (EFW) facility were determined via XRF, and presented in Table 15. However, the final raw clinker blend was prepared from three ash residues rather than two, and used less than 5% additives (fine silica sand and hydrated-lime). The blend comprised 36.76% waste-lime, 29.41% A fly ash, 29.41% bottom ash, 2.91% Ca(OH)$_2$, and 1.47% SiO$_2$ sand. FIG. 21 shows the locations of the residues on the CAS ternary phase diagram. The raw clinker had an LSF of 0.77, SR of 1.96, AR of 2.07, BR of 2.55, Al of 2.9, HM of 1.37, Cm of 1.09, P of 0.49, and LR of 1.90.

TABLE 15

Chemical compositions and LOI of Emerald-EFW incinerator residues and the resulting raw clinker blend.
Composition wt % (DL = 0.01%)

| Oxide | APC Lime | Boiler Ash | Bottom Ash | Raw Clinker |
|---|---|---|---|---|
| SiO$_2$ | 1.79 | 10.05 | 25.91 | 15.69 |
| TiO$_2$ | 0.09 | 1.69 | 2.17 | 1.44 |
| Al$_2$O$_3$ | 0.17 | 4.10 | 10.57 | 5.41 |
| Fe$_2$O$_3$ | 0.15 | 2.19 | 4.81 | 2.61 |
| MnO | 0.01 | 0.07 | 0.44 | 0.19 |
| MgO | 1.06 | 1.57 | 1.81 | 1.71 |
| CaO | 55.47 | 18.31 | 12.71 | 40.08 |
| Na$_2$O | 0.41 | 8.83 | 2.09 | 4.15 |
| K$_2$O | 0.49 | 6.52 | 1.16 | 3.01 |
| P$_2$O$_5$ | 0.13 | 1.40 | 1.44 | 1.09 |
| Total-C | 1.97 | 0.02 | 23.7 | 9.51 |
| Total-S | 0.43 | 10.9 | 0.60 | 4.37 |
| Cl | 17.30 | 6.21 | 1.59 | 10.69 |
| LOI | 18.37 | 10.17 | 33.79 | — |

Clinker Preparation

Figure 22:
FIG. 22 illustrates nodule making using a rotating drum nodulizer.
Figure 23:
FIG. 23 illustrates the clinkering of nodules.

In oppose to preparing disks from raw clinker as done in previous attempts, this process was modified to making nodules instead through the use of a rotary drum nodulizer, as shown in FIG. 22. This simplified the clinker-making process and improved practicality. Proportioned water spraying was carried out during drum rotation to ensure the formation of homogenous spherical nodules. Different diameter sizes of nodules can be produced by varying the rpm, water content, and tilt angle of the nodulizer. To test the size-effect of the clinkered nodules, two size ranges were chosen, 2.5-5 mm and 5-10 mm, and subject to the same processing conditions. FIG. 23 is an image of the nodules undergoing the clinkering step.

Clinker Performance: Strength & CO$_2$ Uptake

Figure 24:
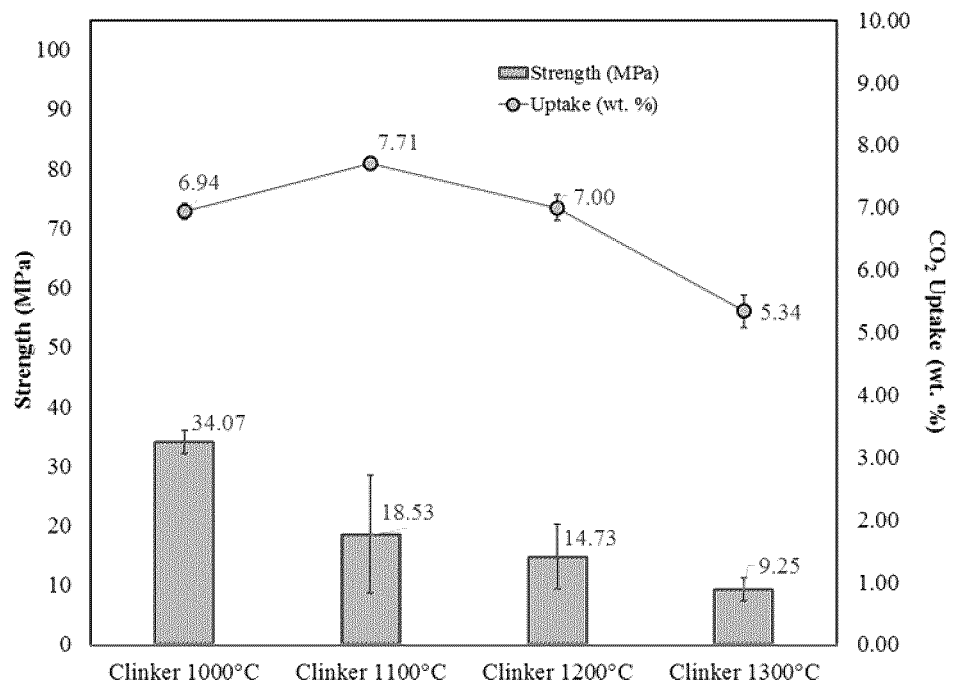
FIG. 24 illustrates compressive strength and CO$_2$ uptake for carbonated compacts prepared from clinker powders produced at different temperatures.

Four different clinkering temperatures were chosen. Clinkered nodules from each temperature were cooled in air and then pulverized to a fine powder. These were then formed into cylindrical compacts by mixing with partial additions of water, and then subject to a 2-hour carbonation in an air-tight vessel pressurized to 22 psig using high-purity CO$_2$ gas. The results for compressive strength and uptake are shown in FIG. 24. Clinker temperatures 1000° C. and 1100° C. displayed the most promising reactivity in terms of strength and uptake. These were chosen for further parametric considerations directed at optimizing the processing route.

Figure 25:
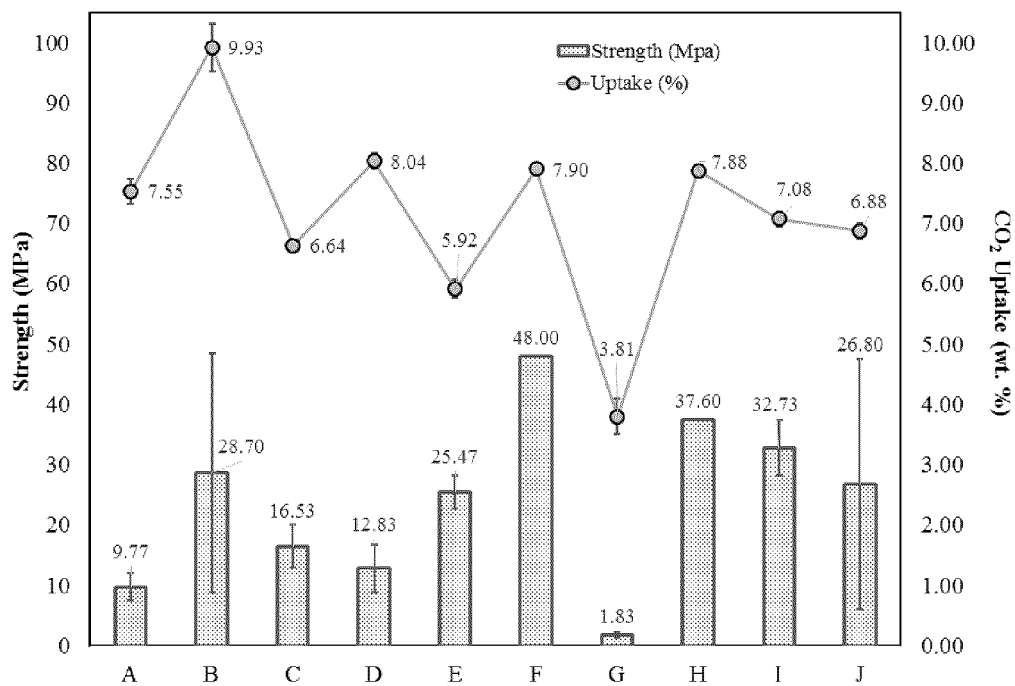
FIG. 25 illustrates compressive strength and CO$_2$ uptake for carbonated compacts prepared from clinker powder batches produced as indicated in Table 16.

Table 16 lists the successive batches of clinker prepared with varying processing parameters such as clinkering temperature, duration, cooling method, and nodule size. Similarly, compressive strength and CO$_2$ uptake were performed for these batches to assess carbonation reactivity, and the results are summarized in the graph of FIG. 25. The compacts that demonstrated the best combined strength and uptake was that of Batch F.

TABLE 16

Variable processing parameters for optimizing clinker-making

| Batch | Clinkering Temp. | Clinkering Duration (hr) | Cooling Method | Nodule Size |
|---|---|---|---|---|
| A | 1000° C. | 1 | water | small |
| B | 1000° C. | 2 | water | small |
| C | 1000° C. | 2 | air | small |
| D | 1000° C. | 1 | air | big |
| E | 1000° C. | 2 | air | big |
| F | 1100° C. | 1 | air | small |
| G | 1100° C. | 1 | air | big |
| H | 1100° C. | 2 | air | small |
| I | 1100° C. | 2 | air | big |
| J | 1100° C. | 2 | air | small |

*Small: 2.5-5 mm diameter nodules
** Big: 5-10 mm diameter nodules

Figure 26:
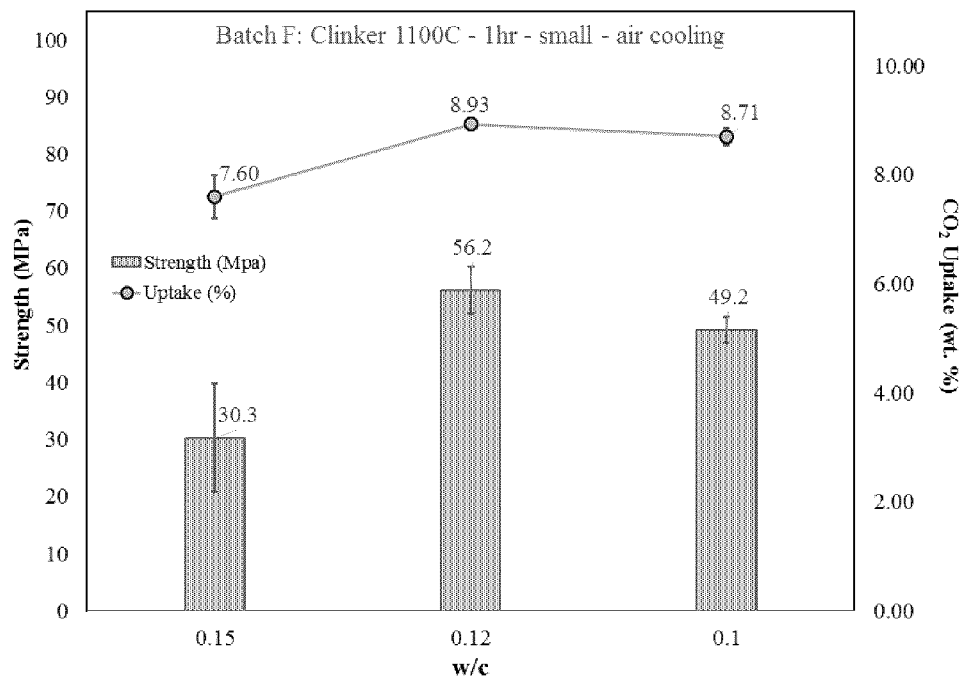
FIG. 26 illustrates compressive strength and CO$_2$ uptake for carbonated compacts prepared from clinker Batch F using different w/c ratios.

During the preparation of the compacts from the clinkered Batch F blend powder, and prior to carbonation, an excess wetting behaviour was noticed when mixing the clinker powder with a w/c ratio of 0.15. This could very likely be a result of the powder's rheological properties. This may have led to a limitation in CO$_2$ reactivity as a result of decreased gas diffusion into the compacts. In order to investigate this phenomenon, an additional test was conducted where compacts with different w/c ratios (0.15, 0.12, and 0.10) were prepared and carbonated for 2 hours at 22 psig. The results of this test are plotted in FIG. 26. In fact, a reduction in mix water to a ratio of 0.12 yielded higher strength and CO$_2$ uptake. A compressive strength of 56 MPa and a CO$_2$ uptake of 8.9% were recorded.

Effect of Prolonged Carbonation

Figure 27:
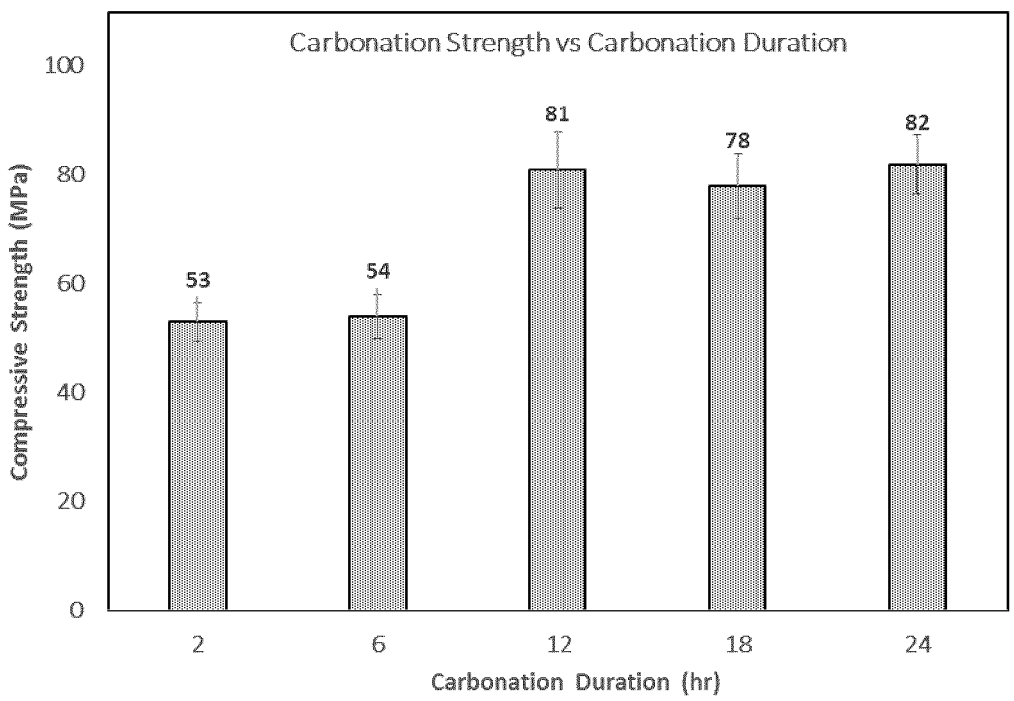
FIG. 27 illustrates the compressive strength of clinker compacts subject to prolonged carbonation curing.

Compacts from Batch F clinker were subject to prolonged carbonation curing to assess the extent of the clinker's CO$_2$ reactivity and strength gain. Carbonation was carried out like previous but extended to periods of 6, 12, 18, and 24 hours. FIG. 27 presents the compressive strength results as a function of carbonation time. The clinker consistently achieves strengths of above 50 MPa over short periods of carbonation that range between 2 and 6 hours. Interestingly, a considerable latent surge in strength is experienced by the 12 hour mark. A secondary strength-inducing mechanism seems to get activated between 6 and 12 hours of carbonation. Longer durations beyond 12 hours did not contribute to further strength gain.

Ash-Derived Clinker use in Concrete

Slabs of concrete were prepared to compare the binding strength of clinker versus OPC (ordinary Portland cement). The slabs were cast in 2×2 inch molds and granite was used as the aggregate component. The mix design comprised 14% binder, 81% aggregates, and 5% water. Serving as the commercial benchmark, slabs prepared from the combination of OPC/granite were subject to 28 days of hydration in a fog room (RH=100%) following casting. Since the ash-derived clinker is primarily carbonation activated, slabs of clinker/granite had only undergone carbonation for durations of 2 and 12 hours. However, prior to carbonation, the slabs were allowed to set in ambient conditions until 35-45% of the mix water was lost. Table 17 summarizes these results. The clinker demonstrated an early-age binding performance comparable to 28-day hydrated commercial OPC. Clinker-based concrete achieved 70% and 80% of the 28-day hydrated OPC-concrete strength in just 2 hours and 12 hours of carbonation, respectively.

TABLE 17

Average compressive strength for concrete cubes prepared from different component combinations.

| Concrete | Compressive Strength (MPa) | | |
| --- | --- | --- | --- |
| | 2 hour Carbonation | 12 hour Carbonation | 28 day Hydration |
| OPC/Granite | — | — | 46.2 ± 3.8 |
| Clinker/Granite | 32.3 ± 4.1 | 37.6 ± 3.7 | — |

Other Raw Blend Formulations

Additional raw blends of ash residues were assessed for $CO_2$ reactivity and latent hydraulic strength after being clinkered for 1 hour at 1100° C. These tests were carried out to explore slight modifications to the basicity ratio (BR), the zero use of additives, and compounded latent hydraulic strength behavior. For the latter, compacts were submerged in water for 28 days following a 2-hour carbonation. Table 18 lists the ash proportioning for each blend and summarizes the results obtained.

TABLE 18

Additional raw blend formulations and average $CO_2$ uptake, 2-hour carbonation strength, and subsequent 28-day hydration strength results for compact specimens.

| Blend | Waste-lime | Fly ash | Bottom ash | Additives | | $CO_2$ Uptake (%) | Strength (MPa) | |
| --- | --- | --- | --- | --- | --- | --- | --- | --- |
| | | | | $Ca(OH)_2$ | $SiO_2$ | | 2 hr carbonation | +28 day hydration |
| #1 | 36.04 | 28.80 | 28.80 | 4.90 | 1.47 | 7.8 | 49.4 | 53.0 |
| #2 | 34.36 | 27.45 | 27.45 | 9.34 | 1.40 | 7.1 | 23.0 | 34.6 |
| #3 | 36.58 | 29.22 | 29.22 | 4.97 | 0.00 | 5.8 | 38.2 | 34.5 |
| #4 | 50.00 | 15.00 | 35.00 | 0.00 | 0.00 | 2.5 | 9.7 | 36.4 |
| #5 | 40.00 | 10.00 | 50.00 | 0.00 | 0.00 | 4.7 | 19.3 | 24.6 |
| #6 | 45.00 | 20.00 | 35.00 | 0.00 | 0.00 | 6.8 | 34.5 | 42.5 |
| #7 | 50.00 | 20.00 | 30.00 | 0.00 | 0.00 | 3.0 | 8.5 | 33.4 |
| #8 | 45.00 | 30.00 | 25.00 | 0.00 | 0.00 | 3.3 | 16.7 | 55.2 |
| #9 | 45.00 | 25.00 | 30.00 | 0.00 | 0.00 | 3.4 | 12.1 | 62.6 |
| #10 | 42.86 | 19.05 | 33.33 | 4.76 | 0.00 | 2.1 | 10.5 | 48.0 |
| #11 | 42.86 | 23.81 | 28.57 | 4.76 | 0.00 | 4.3 | 35.4 | — |
| #12 | 40.00 | 0.00 | 60.00 | 0.00 | 0.00 | 4.7 | 27.0 | — |
| #13 | 30.00 | 60.00 | 10.00 | 0.00 | 0.00 | 3.7 | 31.6 | — |

Blend #9 displays a very interesting behavior. While not highly reactive to $CO_2$, as reflected by the uptake and early-age strength values, compacts of this blend demonstrated a considerable capacity to develop latent strength from subsequent hydration. It seems that initial carbonation helped promote subsequent hydration, since compacts that were subject to hydration yielded 18 MPa of strength after 28 days of water submersion, compared to 62.6 MPa when preceded by a 2-hour carbonation.

Raw Blend #9 had an LSF of 0.89, SR of 1.75, AR of 2.08, BR of 3.01, Al of 2.60, HM of 1.60, Cm of 1.36, P of 0.55, and LR of 2.17. Mineralogical analysis of the clinkered blend at 1100° C. was performed by quantitative X-Ray diffraction (QXRD), giving the following phase distribution: 49.8% chloro-ellestadite, 13% di-calcium-silicate, 9.8% wadalite/mayenite, 5.1% halite, 2.0% sylvite, 3.8% bredigite, and 16.1% unidentifiable amorphous content.

Building Application: Lightweight Paver/Brick Demonstration

To demonstrate the practical use of the promising Clinker Batch F, lightweight pavers/bricks were considered as a potential end-product that utilizes all waste residues collected from the same incinerator facility. The aggregate component of the proposed bricks consisted of processed and graded bottom ash. Bottom ash was carefully washed, dried, subject to volatilization treatment (at 190° C.), and then graded according to the gradation criteria of Table 19, and size distribution curve of FIG. 10. The bottom ash meets the Canadian CSA-A23.1 sieve-grading limits for FA-2 type aggregates. Bottom ash is characteristically low in density, therefore suitable service applications should specify 'lightweight' material. Moreover, the absorption of bottom ash after water immersion for 72 hours and drying to SSD conditions was found to be around 20%. This should be accounted for during mixing so that the desired w/c (water-to-clinker ratio) during casting in not altered.

TABLE 19

Gradation criteria for the bottom ash aggregate material.

| Sieve Size (mm) | Cumulative Retained (%) | Cumulative Passing (%) |
| --- | --- | --- |
| 5 | 15.5 | 84.5 |
| 2.5 | 31.0 | 69.0 |
| 1.25 | 56.7 | 43.3 |
| 0.63 | 77.3 | 22.7 |
| 0.315 | 92.8 | 7.2 |
| 0.16 | 100.0 | 0.0 |
| FM* | 3.73 | |
| Absorption (dry to SSD) | ~20% | |

*Fineness Modulus = (sum of cumulative % retained from sieves 150 μm and above)/100

FIG. 11 shows the processed bottom ash aggregate material. This was then mixed with clinker (Batch F) and water, according to the mix design shown in FIG. 12, and cast into 8×8×8 cm paver/bricks. After de-molding, the brick shown in the figure was allowed to sit in an exposed environment until approximately 35-45% of total water (aggregates+mix water) was lost. This would ensure enhanced $CO_2$ penetration into the brick during carbonation. Carbonation was carried out for 2 hours at 22 psig, using pure $CO_2$ gas. The brick was able to uptake a cumulative 13 g of $CO_2$ (13.2 wt. % of the clinker).

Further optimization to be carried out will target increased strength gain and $CO_2$ uptake per brick, qualities that may be improved by, for example, increasing compaction load, increasing clinker loading in mix design, adjusting aggregate gradation, partial substitution with natural stone, etc. . . . In order to facilitate future practical implementation, curing will move towards low-pressure to ambient-pressure carbonation, and eventually cross-over to utilizing flue-gas rather than pure $CO_2$.

Environmental Performance

While preliminary leaching tests (EPA TCLP and SPLP) deemed the clinker product safe with respect to heavy-metal release, a much more in-depth environmental appraisal of the ash-derived clinker and building products needs to be carried out. The tests to be chosen need to evaluate and monitor concentrations of poly-cyclic aromatic hydrocarbons (PAH), volatile organic contaminants (VOC), furans, dioxins, and Cl. The processing methodology is believed to contribute a dual stabilization effect. The first is attributed to clinkering, which involves the thermal destruction of organic contaminants, and the structural incorporation of hazardous elemental components in the generated clinker phases. The second stabilizing mechanism arises from carbonation, where the monolith paste matrix generated as a result of the reaction induces an encapsulation effect. Moreover, the precipitation of carbonates lends a densification effect to the binder's microstructure, reducing porosity and permeability. This aids in the retention of leachable components.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A process for synthesis of a waste-derived $CO_2$-activated clinker, which comprises firing nodules at temperatures between 1000-1100° C. for a time sufficient to obtain $CO_2$-reactive clinker phases within the nodules, cooling the clinker nodules, and reducing to powder to obtain a clinker powder;
   wherein the nodules are agglomerates of a stoichiometric mix of uniformly-sized powders of municipal solid waste (MSW) incineration residues;
   wherein the stoichiometric mix respects the primary compositional requisite of containing the elements Ca, Al, and Si expressed in their oxide forms within the ranges of 35-45 wt. % CaO, 2-8 wt. % $Al_2O_3$, and 12-20 wt. % $SiO_2$;
   wherein the remaining portion of the stoichiometric mix can comprise oxides or compounds of Mg, Fe, Na, K, P, S, C, and Cl;
   wherein the final stoichiometric mix has a total-sulfur content of 1 to 10 wt. %, total-carbon content of 2 to 20 wt. %, and a total-chlorine content of 2 to 15 wt. %.

2. The process of claim 1, wherein the clinker comprises one or a combination of $CO_2$-reactive mineral components chosen from ellestadite (chloro, fluor, or hydroxyl fixations), mono-calcium silicates, di-calcium-silicates, sulfo-aluminate di-calcium-silicates, and tri-calcium-silicates;
   wherein the clinker can also comprise one or a combination of the following mineral phases: wadalite, mayenite, akermanite, gehlenite, bredigite, anhydrite, ronderfite, quartz, halite/sylvite, and an amorphous fraction with no detectable mineralogy.

3. The process of claim 2, wherein weight-percent ranges of mineral components are
   about 25-50% Chloro-ellestadite $(Ca_{10}(SiO_4)_3(SO_4)_3Cl_2)$;
   about 5-25% Di-calcium-silicates (α, β, and/or γ $Ca_2SiO_4$);
   about 5-15% Wadalite/Mayenite $(Ca_6Al_5Si_2O_{16}Cl_3/Ca_{12}Al_{14}O_{33})$;
   about 5-7.5% Ronderfite $(Ca_8Mg(SiO_4)_4Cl_2)$;
   about 2-6% Halite/Sylvite (NaCl/KCl);
   about 5-15% Akermanite/Gehlenite $(Ca_2MgSi_2O_7/CaAl_2Si_2O_7)$;
   about 5-15% Bredigite $((Ca,Ba)Ca_{13}Mg_2(SiO_4)_8)$;
   about 1-7.5% Anhydrite $(CaSO_4)$;
   about 1-2% Quartz $(SiO_2)$; and
   about 10-30% amorphous undetectable content.

4. The process of claim 1, wherein energy required for the firing of the nodules is locally-sourced and achieved in a kiln system embedded within an incinerator's combustion zone for direct recovery of heat generated during the incineration process, or in an electrically-driven auxiliary stand-alone kiln system powered by electricity generated by an incinerator facility.

5. The process of claim 1, wherein the nodules firing is for a time between about 30 to 60 minutes.

6. The process of claim 4, wherein the kiln system has a tubular kiln apparatus installed inside a combustion chamber of the incinerator.

7. The process of claim 4, wherein the kiln system is a stand-alone apparatus that achieves firing through electrical resistance heating and powered by electricity generated by the incinerator plant.

8. A clinker material produced according to the process of claim 1, wherein said clinker has a unique mineralogy comprising the primary CO2-reactive phases of Chloro-ellestadite (25-50 wt. %) and di-calcium-silicates (5-25 wt. %), and the ability to achieve rapid binding strength from carbonation and additional latent strength from subsequent hydraulic reactivity.

9. The clinker material of claim 8, wherein binding strength activation is achieved by conducting carbonation in an air-tight enclosure for durations ranging from 2 to 24 hours using high (>90%) or low purity (between 15 and 90%) CO2 gas;
   wherein the air-tight enclosure can withstand marginal loads of negative pressure (up to −3 psig) and positive pressure (up to +14 psig).

10. A process for the production of building units, which comprises combining the clinker of claim 8 as a binder and a primed bottom ash as the aggregate component with carbon dioxide as a primary strength activator for a time sufficient for consolidative strength-gain, the primed bottom ash having bottom ash residues of a municipal solid waste (MSW) incinerator that have been sufficiently stabilized through one or a combination of the following techniques: magnetic-separation, washing, and volatilization at 200° C.;
   wherein the stabilized bottom ash is graded to fit the size distribution of a typical lightweight aggregate material used in precast concrete applications.

11. A building product produced by the process of claim 4 suited for non-reinforced low-load-bearing or non-load-bearing concrete precast applications.

* * * * *